US008155395B2

(12) United States Patent
Kobayashi et al.

(10) Patent No.: US 8,155,395 B2
(45) Date of Patent: Apr. 10, 2012

(54) IRIS AUTHENTICATION APPARATUS

(75) Inventors: Koji Kobayashi, Tokyo (JP); Atsushi Katsumata, Tokyo (JP); Hiroshi Nakajima, Tokyo (JP); Kazuyuki Miyazawa, Miyagi (JP); Koichi Ito, Miyagi (JP); Takafumi Aoki, Miyagi (JP)

(73) Assignees: Yamatake Corporation, Tokyo (JP); National University Corporation Tohoku University, Miyagi (JP)

( * ) Notice: Subject to any disclaimer, the term of this patent is extended or adjusted under 35 U.S.C. 154(b) by 1232 days.

(21) Appl. No.: 11/495,326

(22) Filed: Jul. 28, 2006

(65) Prior Publication Data

US 2007/0025598 A1 Feb. 1, 2007

(30) Foreign Application Priority Data

Jul. 29, 2005 (JP) ................................ 2005-220034

(51) Int. Cl.
*G06K 9/00* (2006.01)
(52) U.S. Cl. ........................................................ 382/117
(58) Field of Classification Search .................... None
See application file for complete search history.

(56) References Cited

U.S. PATENT DOCUMENTS

| 6,614,919 B1* | 9/2003 | Suzaki et al. ................. 382/117 |
| 2004/0114781 A1* | 6/2004 | Cho .............................. 382/117 |
| 2005/0008200 A1* | 1/2005 | Azuma et al. ................. 382/117 |

FOREIGN PATENT DOCUMENTS

| JP | 10-063847 A | 3/1998 |
| JP | 2000-189403 | 7/2000 |
| JP | 2002-269565 | 9/2002 |
| JP | 2004-030564 | 1/2004 |
| JP | 2004030564 A * | 1/2004 |
| WO | WO 94/09446 A | 4/1994 |

OTHER PUBLICATIONS

Ito et al., "A Fingerprint Matching Algorithm Based on Band-Limited Phase-Only Correlation", Proceedings of Conference of SICE Tohoku Chapter, No. 216-15, Jun. 2004.*
Takita et al., "High-accuracy subpixel registration based on phase-only correlation", IEICE Trans. Fundamentals, vol. E86-A, No. 8, pp. 1925-1934, Aug. 2003.
Ito et al., "A Fingerprint matching Algorithm using phase-only correlation", IEICE Trans. Fundamentals, vol. E87-A, No. 3, pp. 682-691, Mar. 2004.
Morita et al., "A Study of a Fingerprint Matching Algorithm Based on the Combination of Phase-Only Correlation and Feature-Based Matching", Proceedings of Conference of SICE Tohoku Chapter, No. 219-5, Nov. 2004.

* cited by examiner

*Primary Examiner* — Samir A. Ahmed
*Assistant Examiner* — Fred Hu
(74) *Attorney, Agent, or Firm* — Blakely, Sokoloff, Taylor & Zafman

(57) ABSTRACT

An iris authentication apparatus includes an iris area extraction unit, registration pattern generating unit, collation pattern generating unit, and collation unit. The iris area extraction unit extracts iris areas from a sensed registration eyeball image and a sensed collation eyeball image. When the iris area extraction unit extracts an iris area from the registration eyeball image, the registration pattern generating unit generates a registration iris pattern image by performing polar coordinate transformation of an image in the extracted iris area. When the iris area extraction unit extracts an iris area from the collation eyeball image, the collation pattern generating unit generates a collation iris pattern image by performing polar coordinate transformation of an image in the extracted iris area. The collation unit collates the registration iris pattern image output from the registration pattern generating unit and the collation iris pattern image output from the collation pattern generating unit on the basis of a correlation therebetween.

5 Claims, 23 Drawing Sheets

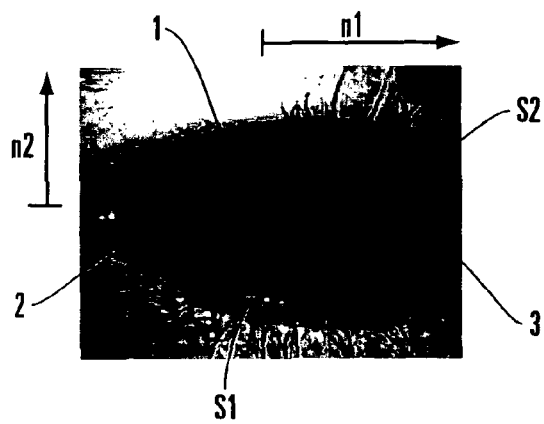
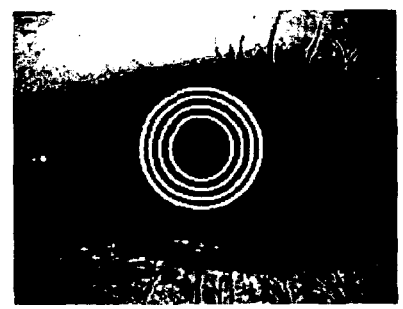
FIG.3A  FIG.3B
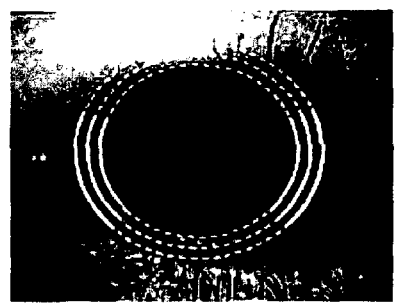
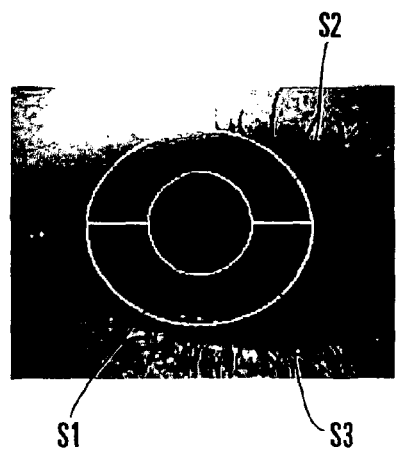
FIG.3C  FIG.3D

COLLATION ORIGINAL IMAGE

G (n1, n2)

COLLATION IRIS PATTERN IMAGE g (p1, p2)

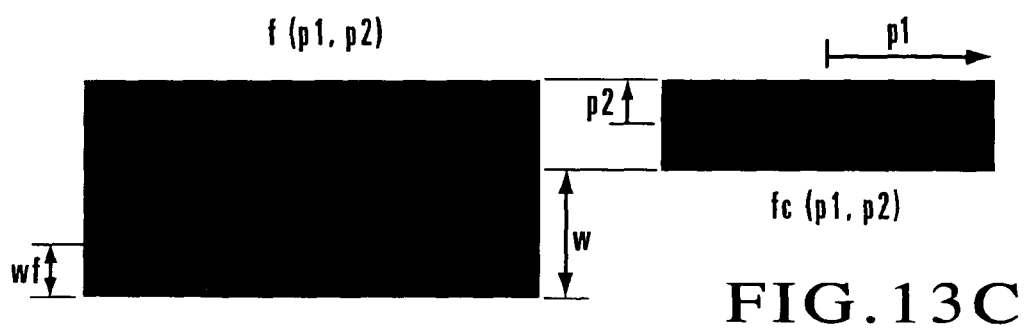
FIG.13A
FIG.13C
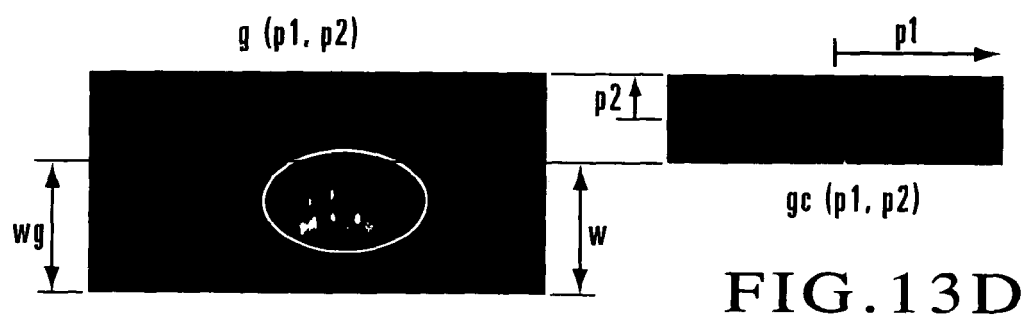
FIG.13B
FIG.13D

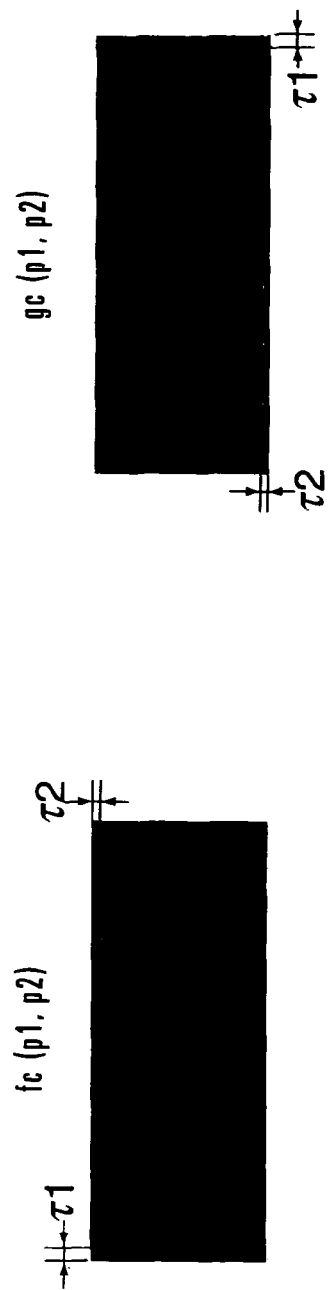
FIG.14A
FIG.14B
FIG.14C REGISTRATION IMAGE
FIG.14D COLLATION IMAGE

IRIS AUTHENTICATION APPARATUS

BACKGROUND OF THE INVENTION

The present invention relates to an iris authentication apparatus which authenticates an individual from his/her iris which adjusts the amount of light entering the eye.

Conventionally, as an iris authentication apparatus of this type, an iris authentication apparatus like that disclosed in WO 94/09446 (reference 1) has been used. This iris authentication apparatus cuts an iris portion in the form of a plurality of arcuated portions (see FIG. 23: arcs SO) from a sensed eye image (eyeball image), and extracts the features of an iris pattern by using a bandpass filter such as a Gabor filter, thereby generating a one-dimensional code (iris code) for each arc SO. Such iris codes are generated for a registration eyeball image and a collation eyeball image, respectively. The Hamming distance between the iris codes is obtained, and the authentic person is discriminated from others on the basis of the Hamming distance.

Note that the iris is a diaphragm which is located between the cornea and eye lens of the eyeball, has a pupil in the center, and adjusts the amount of light entering the eyeball. The sclera (the white of the eye) is located outside the iris. A pattern is formed in the iris after about seven or eight months of pregnancy and becomes stable about two years after birth. The pattern is kept unchanged throughout lifetime. The left and right eyes of even the same person have different iris patterns, which are hardly generically influenced. In addition, since the iris is an internal organ, the iris is robust against damage and allows authentication in a noncontact manner.

According to the iris authentication apparatus disclosed in reference 1 described above, however, since an iris portion is cut out in the form of a plurality of arcuated portions from an eyeball image and processing is performed for each arc SO, if a cutting error concerning arcuated areas (an error in the radial direction, in particular) occurs, the iris position where feature extraction should be performed by a Gabor filter varies depending on whether a registration eyeball image or a collation eyeball image is to be processed. As a consequence, accurate authentication cannot be performed.

SUMMARY OF THE INVENTION

It is an object of the present invention to provide an iris authentication apparatus which can accurately perform authentication even if a slight error occurs in cutting out areas from an eyeball image.

In order to achieve the above object, the present invention comprises an iris area extraction means for extracting an iris area from a sensed eyeball image, a registration pattern generating means for generating a registration iris pattern image by performing polar coordinate transformation of an image of the iris area extracted from a registration eyeball image, a collation pattern generating means for generating a collation iris pattern image by performing polar coordinate transformation of an image of the iris area extracted from a collation eyeball image, and a collation means for collating the registration iris pattern image with the collation iris pattern image on the basis of the correlation between them.

According to the present invention, an image of an iris area extracted from a registration eyeball image is polar-coordinate-transformed into a registration iris pattern image (normalized image), an image of an iris area extracted from a collation eyeball image is polar-coordinate-transformed into a collation iris pattern image (normalized image), and the registration iris pattern image and the collation iris pattern image are collated with each other on the basis of the correlation between them.

In the present invention, a cutting error concerning an iris area may appear as translation, enlargement/reduction, distortion, or the like in an image after polar coordinate transformation (normalized image). However, the cutting error concerning the iris area is very small as compared with the entire area. Therefore, the cutting error concerning the iris area has little influence on a registration iris pattern image and collation iris pattern image after polar coordinate transformation, and accurate authentication can be performed.

According to the present invention, the iris area extraction means detects, for example, the boundary between the pupil and iris of an eyeball image as the inner boundary of the iris by elliptic approximation, detects the boundary between the iris and sclera of the eyeball image as the outer boundary of the iris by circular approximation, and extracts an area sandwiched between the detected inner and outer boundaries of the iris as an iris area.

Actually sensed eyeball images vary depending on the biometric features of individuals and imaging environments, and hence the boundary between the pupil and the iris (the inner boundary of the iris) is not necessarily a perfect circle. If the boundary between the pupil and the iris is detected on the assumption that the boundary is a perfect circle, correct authentication may not be performed. In the present invention, since the boundary between the pupil and the iris is detected on the assumption that the boundary is an ellipse, even if the boundary is not a perfect circle, correct authentication can be performed, thereby improving authentication accuracy.

Note that the boundary between the iris and the sclera (the outer boundary of the iris) often becomes a circle. In this case, either circular approximation or elliptic approximation may be used.

According to the present invention, the registration iris pattern image generating means performs polar coordinate transformation of an image of an iris area extracted from a registration eyeball image with reference to the center of the inner boundary of the iris detected from the registration eyeball image, and the collation iris pattern image generating means performs polar coordinate transformation of an image of an iris area extracted from a collation eyeball image with reference to the center of the inner boundary of the iris detected from the collation eyeball image. In the present invention, the center of the ellipse which is detected from the inner boundary of the iris indicates the accurate center of the pupil. In the present invention, polar coordinate transformation of an image of an iris area is performed with reference to this accurate center of the pupil.

According to the present invention, the collation means cuts out one or more rectangular areas from a registration iris pattern image and a collation iris pattern image so as not to include any non-iris portion, obtains a correlation value between rectangular areas common to the registration iris pattern image and the collation iris pattern image, and collates the registration eyeball image and the collation eyeball image on the basis of the correlation value.

In a sensed eyeball image, an image of an iris area may include an eyelid or eyelash or reflection of light may glare on the image. In this case, such images appear as non-iris portions in the registration iris pattern image and collation iris pattern image generated by polar coordinate transformation. In the present invention, one or more rectangular areas are cut out from a registration iris pattern image and a collation iris pattern image so as not to include such non-iris portions.

The correlation value between rectangular areas (common areas) common to the registration iris pattern image and the collation iris pattern image is obtained, and the two images are collated on the basis of the correlation value.

If there are few non-iris portions, since large areas can be ensured as a registration iris pattern image and a collation iris pattern image, the number of rectangular areas may be one. If there are many non-iris portions, large areas may not be ensured as a registration iris pattern image and a collation iris pattern image. In such a case, for example, widths may be determined stepwise from the upper end of an iris pattern image, and rectangular areas may be cut out for the respective widths. The correlation value between areas common to these rectangular areas may be obtained.

BRIEF DESCRIPTION OF THE DRAWINGS

FIGS. 3A to 3D are views showing registration original images to explain iris registering operation in the iris authentication apparatus shown in FIG. 1;

FIGS. 13A to 13D are views showing photographs on the display which respectively indicate a registration iris pattern image and a collation iris pattern image before and after unnecessary areas are cut off;

FIGS. 14A to 14D are views for explaining displacement correction for a registration iris pattern image and a collation iris pattern image from which unnecessary areas are cut off;

DESCRIPTION OF THE PREFERRED EMBODIMENT

Figure 1:
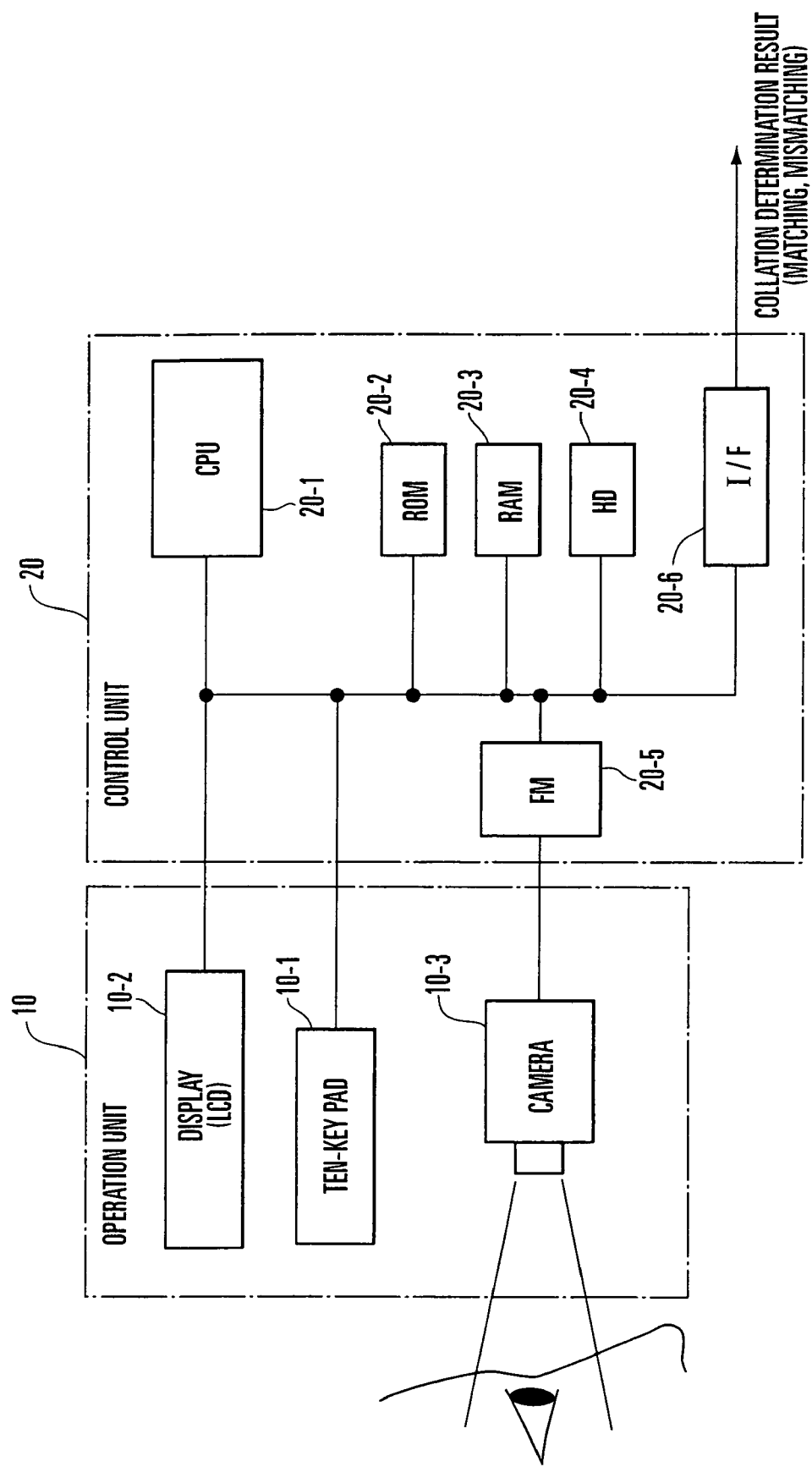
FIG. 1 is a block diagram showing the arrangement of an iris authentication apparatus according to an embodiment of the present invention.

FIG. 1 shows an iris authentication apparatus according to an embodiment of the present invention. Referring to FIG. 1, reference numeral 10 denotes an operation unit; and 20, a control unit. The operation unit 10 includes a ten-key pad 10-1, display (LCD) 10-2, camera (CCD camera) 10-3, and the like.

The control unit 20 comprises a CPU 20-1, ROM 20-2, RAM 20-3, hard disk (HD) 20-4, frame memory (FM) 20-5, and external connection unit (I/F) 20-6. A registration program and collation program are stored as programs unique to this embodiment in the ROM 20-2.

[Registration of Iris]

Figure 2:
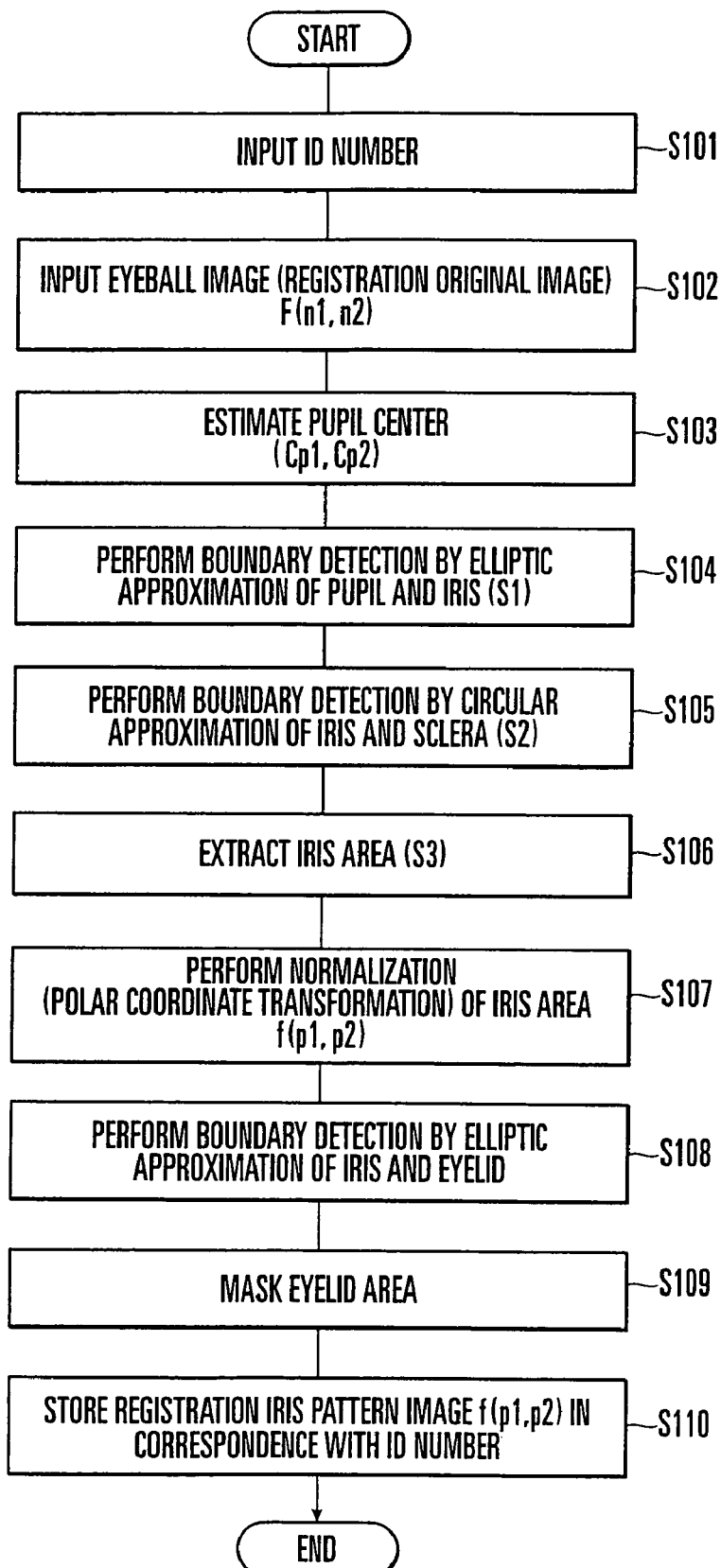
FIG. 2 is a flowchart for explaining iris registering operation in the iris authentication apparatus shown in FIG. 1.

An iris of a user is registered in this iris authentication apparatus in the following manner. Before operation, the user inputs an ID number assigned to him/her by using the ten-key pad 10-1 (FIG. 2: step S101), and stands in front of the camera 10-3. The camera 10-3 senses an eyeball image of the user, and sends the sensed eyeball image as a registration original image $F(n1, n2)$ (see FIG. 3A) to the control unit 20. Note that in the registration original image $F(n1, n2)$, reference numeral 1 denotes a pupil; 2, an iris; and 3, a sclera.

[Estimation of Pupil Center]

Figure 4:
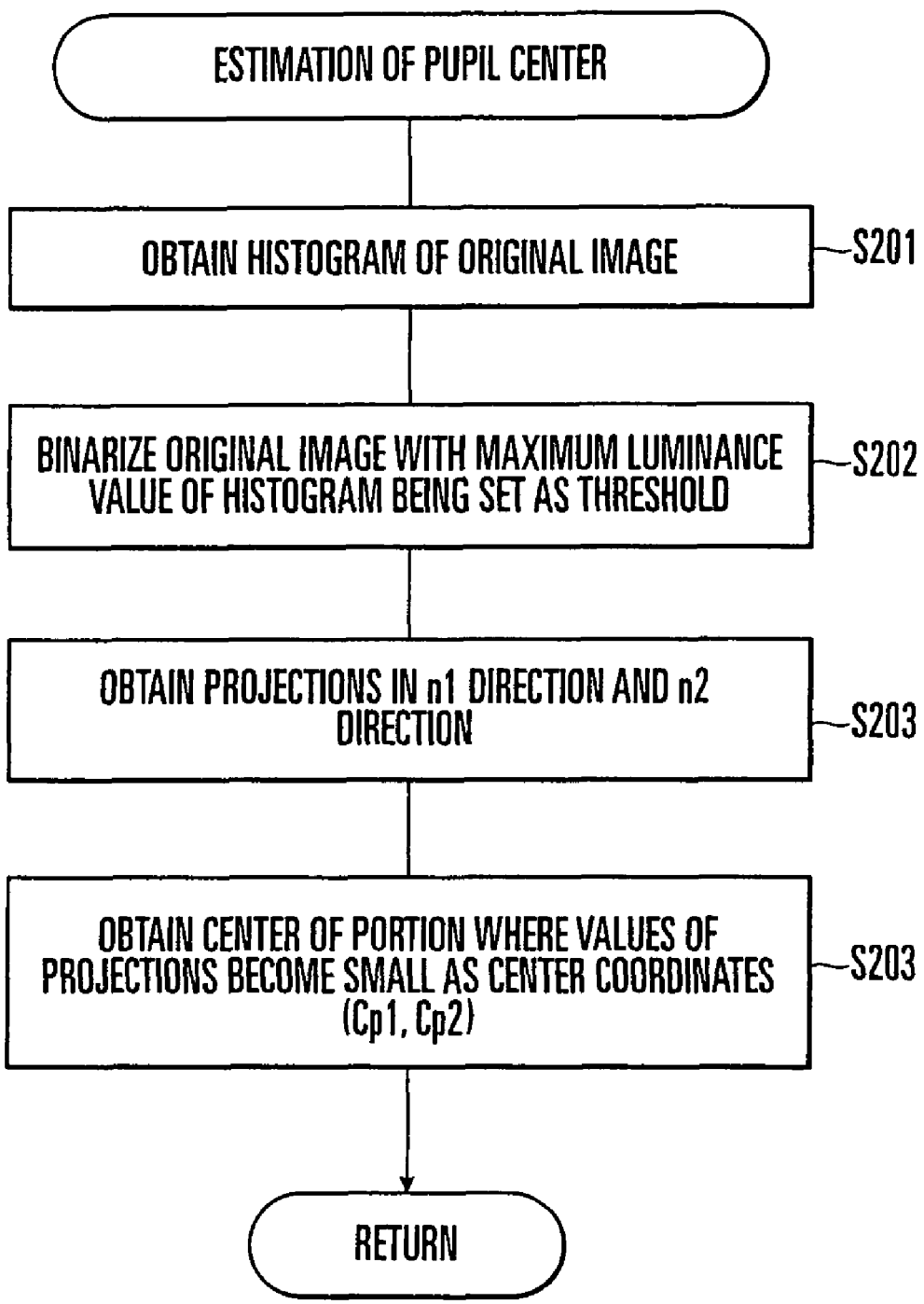
FIG. 4 is a flowchart for explaining how a pupil center is estimated in the iris authentication apparatus shown in FIG. 1.

The CPU 20-1 of the control unit 20 loads the registration original image $F(n1, n2)$ from the operation unit 10 through the frame memory 20-5 (step S102), and estimates a pupil center $(Cp1, Cp2)$ from the loaded registration original image $F(n1, n2)$ (step S103). The pupil center $(Cp1, Cp2)$ is estimated as follows:

(1) The histogram of the registration original image $F(n1, n2)$ is obtained (FIG. 4: step S201).

(2) The registration original image $F(n1, n2)$ is binarized by using the maximum luminance value of the histogram as a threshold (step S202). In this case, the luminance values of pixels having luminance values equal to or less than the threshold are set to "0", and the luminance values of other pixels are set to "1". This processing makes it possible to obtain an image formed by extracting almost only the pupil from the registration original image $F(n1, n2)$.

In this case, the maximum luminance value of the histogram is set as a threshold. However, an image may be binarized by using a predetermined threshold. In this case, the value of a threshold varies depending on the database to be used, a threshold is experimentally determined by using several images. (3) Projections of the binarized image in the n1 direction (horizontal direction) and the n2 direction (vertical direction) are obtained (step S203).

(4) The center of a portion where the values of the projections in the n1 and n2 directions become small is obtained from the projections and is set as a pupil center $(Cp1, Cp2)$ (step S204).

In this case, the pupil center (Cp1, Cp2) is obtained from the projections in the n1 and n2 directions. However, the center of gravity of the image binarized in step S202 may be calculated and set as a pupil center (Cp1, Cp2).

[Boundary Detection by Elliptic Approximation of Pupil and Iris]

The CPU 20-1 detects the boundary between the pupil and the iris (the inner boundary of the iris: indicated by S1 in FIG. 3A) is detected from the loaded registration original image F(n1, n2) (step S104).

The loaded registration original image F(n1, n2) varies depending on the biometric features of the individual and imaging environments, and hence the inner boundary S1 of the iris is not necessarily a perfect circle (it is more often the case that the inner boundary is not a perfect circle). If the inner boundary S1 of the iris is detected on the assumption that the boundary is a perfect circle, correct authentication may not be performed.

In this embodiment, therefore, the inner boundary S1 of the iris is detected by elliptic approximation on the assumption that the boundary is an ellipse. This makes it possible to perform correct authentication and improve the authentication accuracy even if the boundary between the pupil and the iris is not a perfect circle. The inner boundary S1 of the iris is detected by elliptic approximation in the following manner.

Figure 5:
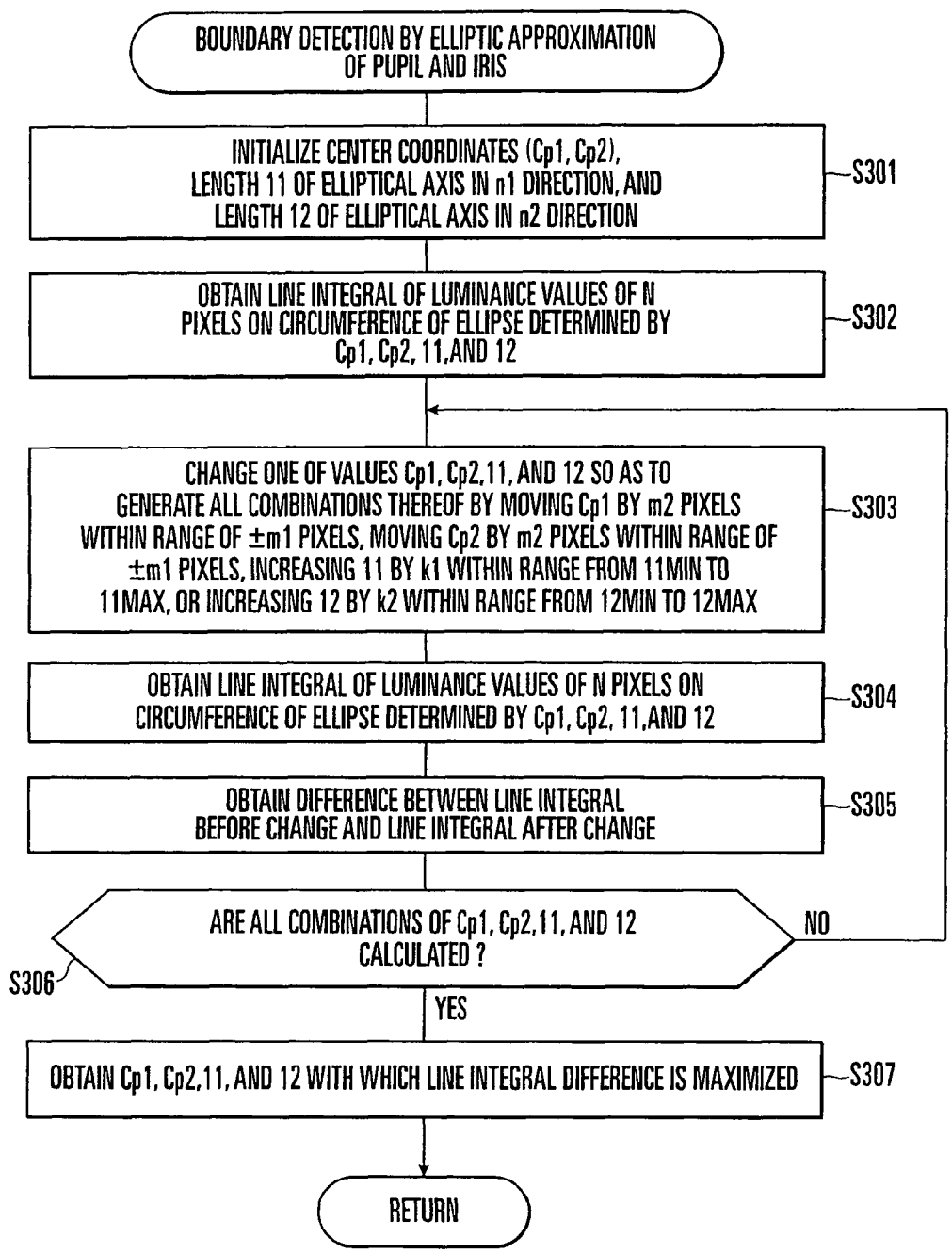
FIG. 5 is a flowchart for explaining boundary detection by elliptic approximation of the pupil and the iris in the iris authentication apparatus shown in FIG. 1.

(1) The inner boundary S1 of the iris is assumed to be an ellipse, and the center coordinates of the boundary, the length of the elliptical axis in the n1 direction, and the elliptical axis in the n2 direction are respectively represented by (Cp1, Cp2), l1, and l2. The center coordinates (Cp1, Cp2), the length l1 of the elliptical axis in the n1 direction, and the length l2 of the ellipse in the n2 direction are initialized (FIG. 5: step S301). In this case, as the center coordinates (Cp1, Cp2), the center (Cp1, Cp2) of the pupil estimated in step S103 is set as an initial value. As the length l1 of the elliptical axis in the n1 direction and the length l2 of the elliptical axis in the n2 direction, predetermined values are set as initial values.

(2) The line integral of the luminance values of N pixels on the circumference of the ellipse determined by Cp1, Cp2, l1, and l2 in the registration original image F(n1, n2) is obtained (step S302).

(3) One of the values Cp1, Cp2, l1, and l2 is changed so as to generate all combinations thereof by "moving Cp1 by m2 pixels within the range of ±m1 pixels", "moving Cp2 by m2 pixels within the range of ±m1 pixels", "increasing l1 by k1 within the range from l1 min to l1 max", or "increasing l2 by k2 within the range from l2 min to l2 max" (step S303).

(4) The line integral of the luminance values of N pixels on the circumference of the ellipse determined by Cp1, Cp2, l1, and l2 after the above change in the registration original image F(n1, n2) is obtained (step S304).

(5) The difference between the line integral before change which is obtained in step S302 and the line integral after change which is obtained in step S304 is obtained (step S305).

(6) It is checked whether the differences between line integrals before change and line integrals after change are obtained with respect to all the combinations of Cp1, Cp2, l1, and l2 (step S306).

(7) By repeating steps S303 to S306, the differences between the line integrals before change and the line integrals after change are obtained with respect to all the combinations of Cp1, Cp2, l1, and l2 (see FIG. 3B).

(8) Among all the combinations, Cp1, Cp2, l1, and l2 with which the line integral difference is maximized are obtained (step S307). The ellipse determined by the obtained values Cp1, Cp2, l1, and l2 is set as the inner boundary S1 of the iris.

Assume that in this detection of the inner boundary S1 of the iris, N=128, m1=3, m2=1, l1 min =30, l1 max=70, k1=1, l2 min=l1−8, l2 max=70, and k2=1.

In this detection of the inner boundary S1 of the iris, more accurate boundary detection can be performed by regarding the inner boundary S1 of the iris as an affine transformation of a circle and taking rotation into consideration as well instead of simply assuming the boundary as an ellipse. That is, elliptic approximation may be performed by using five parameters, i.e., adding a rotation angle to the center coordinates in the n1 direction, the center coordinates in the n2 direction, the length of the elliptical axis in the n1 direction, and the length of the elliptical axis in the n2 direction, and using affine transformation or the like.

[Boundary Detection by Circular Approximation of Iris and Sclera]

The CPU 20-1 detects the boundary between the iris and the sclera (the outer boundary of the iris: indicated by S2 in FIG. 3A) from the loaded registration original image F(n1, n2) (step S105). In many case, the outer boundary S2 of the iris becomes circular (close to a perfect circle). In this embodiment, therefore, the outer boundary S2 of the iris is detected by circular approximation on the assumption that the outer boundary S2 of the iris is a circle. The outer boundary S2 of the iris is detected by circular approximation in the following manner. Note that the outer boundary S2 of the iris may be detected by elliptic approximation like the inner boundary S1.

Figure 6:
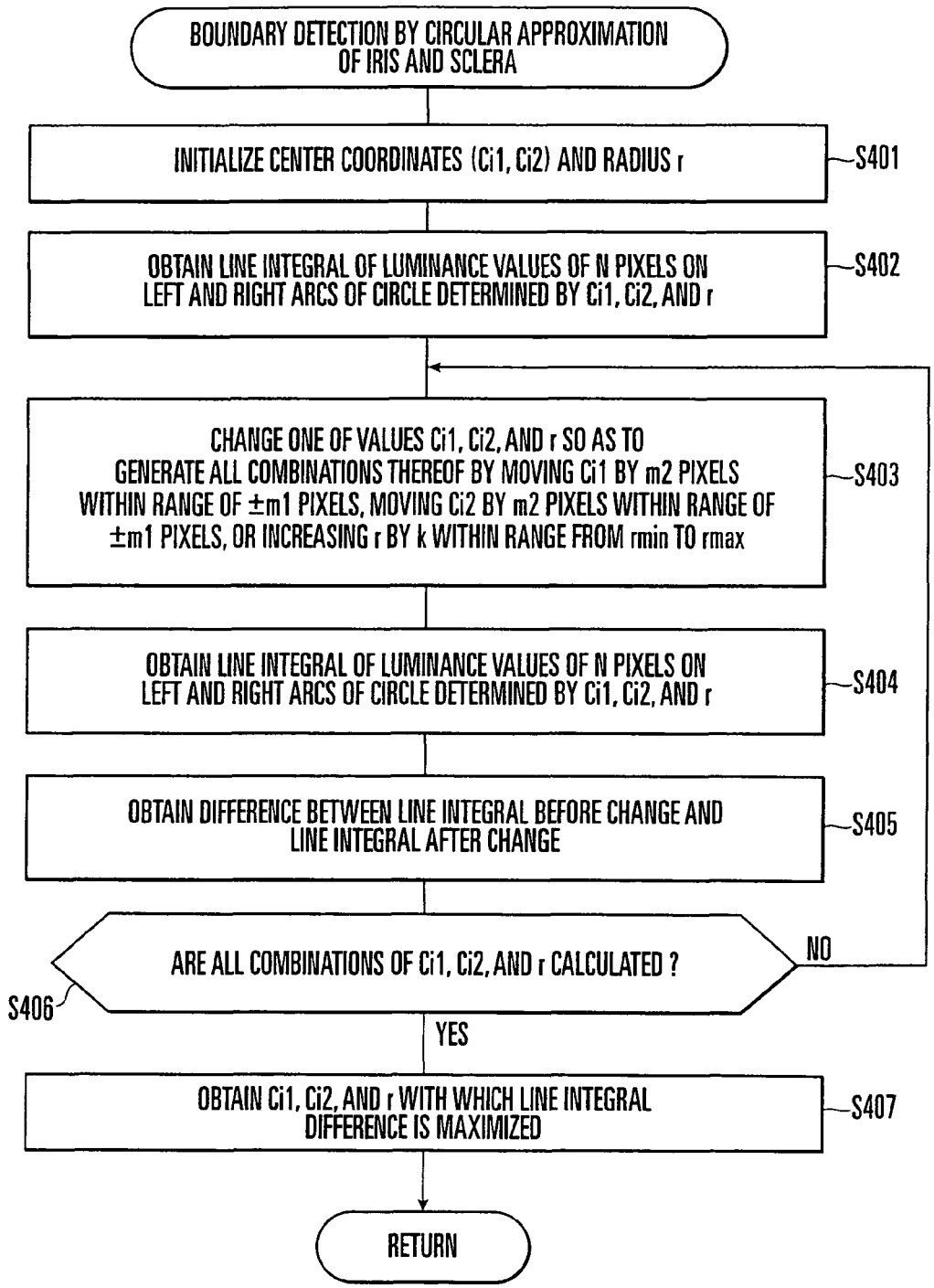
FIG. 6 is a flowchart for explaining boundary detection by circular approximation of the iris and the sclera in the iris authentication apparatus shown in FIG. 1.

(1) The outer boundary S2 of the iris is assumed to be a circle, and the center coordinates and radius of the circle are respectively represented by (Ci1, Ci2) and r. The center coordinates (Ci1, Ci2) and the radius r are initialized (FIG. 6: step S401).

In this case, as the center coordinates (Ci1, Ci2), the center (Cp1, Cp2) of the inner boundary S1 of the iris obtained in step S104 is set as an initial value. As the radius r, a predetermined value is set as an initial value.

(2) The line integral of the luminance values of N pixels (left: N/2 pixels, right: N/2 pixels) on left and right arcs (3π/8 [rad]) of the circle determined by Ci1, Ci2, and r in the registration original image F(n1, n2) is obtained (step S402).

(3) One of the values Ci1, Ci2, and r is changed so as to generate all combinations thereof by "moving Ci1 by m2 pixels within the range of ±m1 pixels", "moving Ci2 by m2 pixels within the range of ±m1 pixels", or "increasing r by k within the range from rmin to rmax" (step S403).

(4) The line integral of the luminance values of N pixels (left: N/2 pixels, right: N/2 pixels) on the left and right arcs (3π/8 [rad]) of the circle determined by Ci1, Ci2, and r after the above change in the registration original image F(n1, n2) is obtained (step S404).

(5) The difference between the line integral before change which is obtained in step S402 and the line integral after change which is obtained in step S404 is obtained (step S405).

(6) It is checked whether the differences between line integrals before change and line integrals after change are obtained with respect to all the combinations of Ci1, Ci2, and r (step S406).

(7) By repeating steps S403 to S406, the differences between the line integrals before change and the line integrals after change are obtained with respect to all the combinations of Ci1, Ci2, and r (see FIG. 3C).

(8) Among all the combinations, Ci1, Ci2, and r with which the line integral difference is maximized are obtained (step S407). The circle determined by the obtained values Ci1, Ci2, and r is set as the outer boundary S2 of the iris.

Assume that in this detection of the outer boundary S2 of the iris, N=100, m1=5, m2=1, rmin=l+10, rmax=l+100, and k=1. Note, however, that l is set to a larger one of the values of l1 and l2 which are obtained in detection of the inner boundary S1 of the iris.

[Extraction of Iris Area]

The CPU 20-1 then extracts an area S3 (see FIG. 3D), as an iris area, which is sandwiched between the inner boundary S1 of the iris which is detected in step S104 and the outer boundary S2 of the iris which is detected in step S105 (step S106).

[Normalization (Polar Coordinate Transformation) of Iris Area]

The radius of the pupil changes with a change in brightness. For this reason, even the iris pattern of the same person changes depending on the timing of imaging. The size of an iris image changes with a change in the distance between the camera and the object.

In this embodiment, a change in iris pattern is regarded as enlargement/reduction in the radial direction, and the image of the iris area S3 is normalized by being polar-coordinate-transformed onto a plane of p1×p2 (step S107).

Note that only the lower half (semicircle) of the iris area S3 is polar-coordinate-transformed, instead of the entire iris area S3, with reference to the center (Cp1, Cp2) of the inner boundary S1 of the iris, i.e., the center (Cp1, Cp2) of the pupil, in order to avoid the influences of the eyelid and eyelash.

Figure 7A:
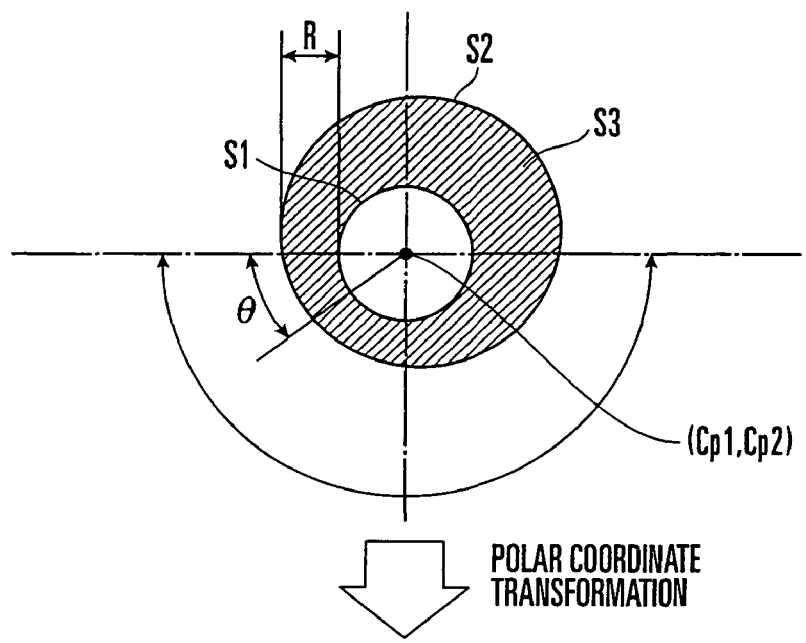
FIGS. 7A and 7B are views for explaining the normalization (polar coordinate transformation) of an iris area in the iris authentication apparatus shown in FIG. 1.
Figure 7B:
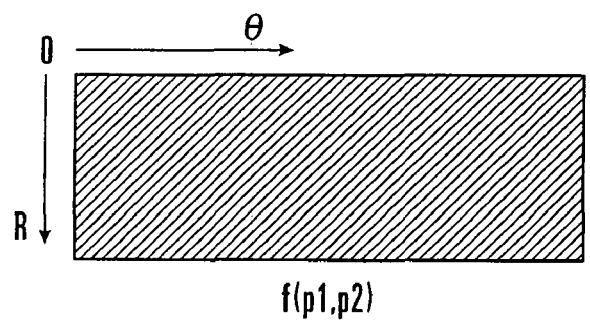

Polar coordinate transformation in this case will be described with reference to FIGS. 7A and 7B. FIG. 7A shows an image of the iris area S3 before polar coordinate transformation. FIG. 7B shows an image (normalized image: to be referred to as an iris pattern image hereinafter) of the iris area S3 after polar coordinate transformation. In the image before polar coordinate transformation, the lower half of the iris area S3 with the center (Cp1, Cp2) of the pupil being the origin is segmented into 256 parts in the circumferential direction (θ direction), and segmented into 128 parts in the radial direction (R direction). The luminances of the respective pixels obtained by this segmentation are plotted along an abscissa θ and an ordinate R to obtain an iris pattern image f(p1, p2).

In this embodiment, the center (Cp1, Cp2) of the pupil is accurately obtained as the center (Cp1, Cp2) of the inner boundary S1 of the iris, and the image of the iris area S3 is polar-coordinate-transformed with reference to the accurate center (Cp1, Cp2) of the pupil. Therefore, accurate authentication can be performed.

[Boundary Detection by Elliptic Approximation of Iris and Eyelid and Masking for Eyelid Area]

In this embodiment, since the lower half of the iris area S3 is used for collation, the influences of the upper eyelid and upper eyelash can be avoided. If, however, the lower eyelid overlaps the iris area S3, accurate collation may not be performed due to the influence of the lower eyelid.

Figure 8A:
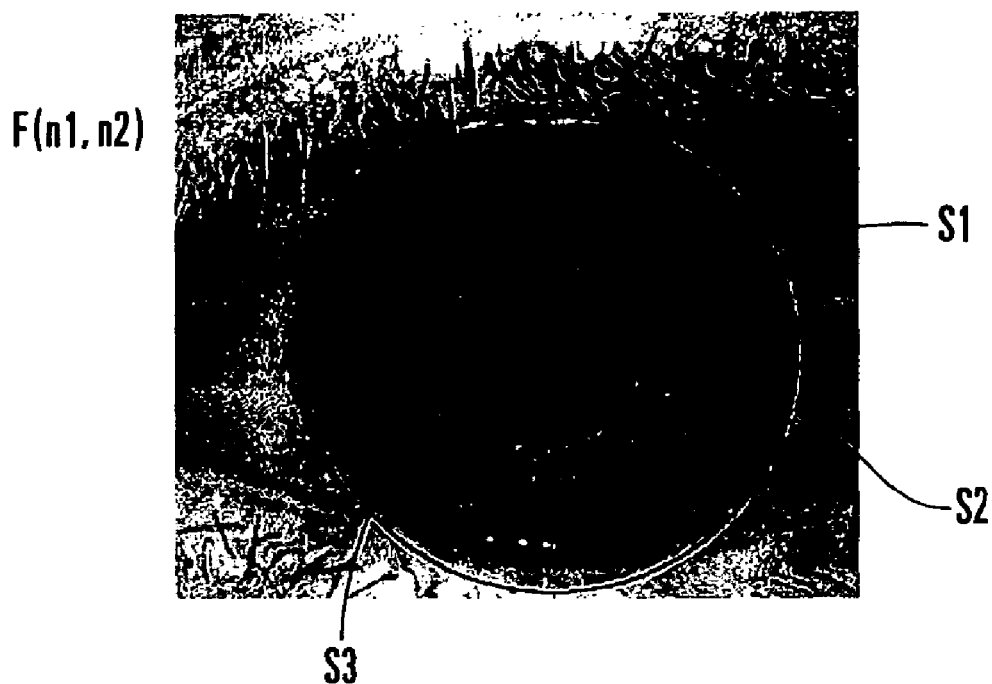
FIGS. 8A and 8B are views showing photographs on a display which indicate a registration original image and an iris pattern image after coordinate transformation (normalized image)
Figure 8B:

FIG. 8A shows the registration original image F(n1, n2) when the lower eyelid overlaps the iris area S3. FIG. 8B shows the iris pattern image f(p1, p2) when the lower eyelid overlaps the iris area S3. In this case, an eyelid area S4 appears in the iris pattern image f(p1, p2). In the eyelid area S4, the boundary (indicated by S5 in FIG. 8B) with the iris can be regarded as part of an ellipse.

In this embodiment, therefore, a boundary S5 (to be referred to as an eyelid boundary hereinafter) between the eyelid area S4 and the iris is assumed to be an ellipse, and is detected by elliptic approximation (step S108). The eyelid area S4 is specified by the eyelid boundary S5, and the eyelid area S4 is masked (step S109). The eyelid boundary S5 is detected by elliptic approximation, and the eyelid area S4 is masked in the following manner.

Figure 9:
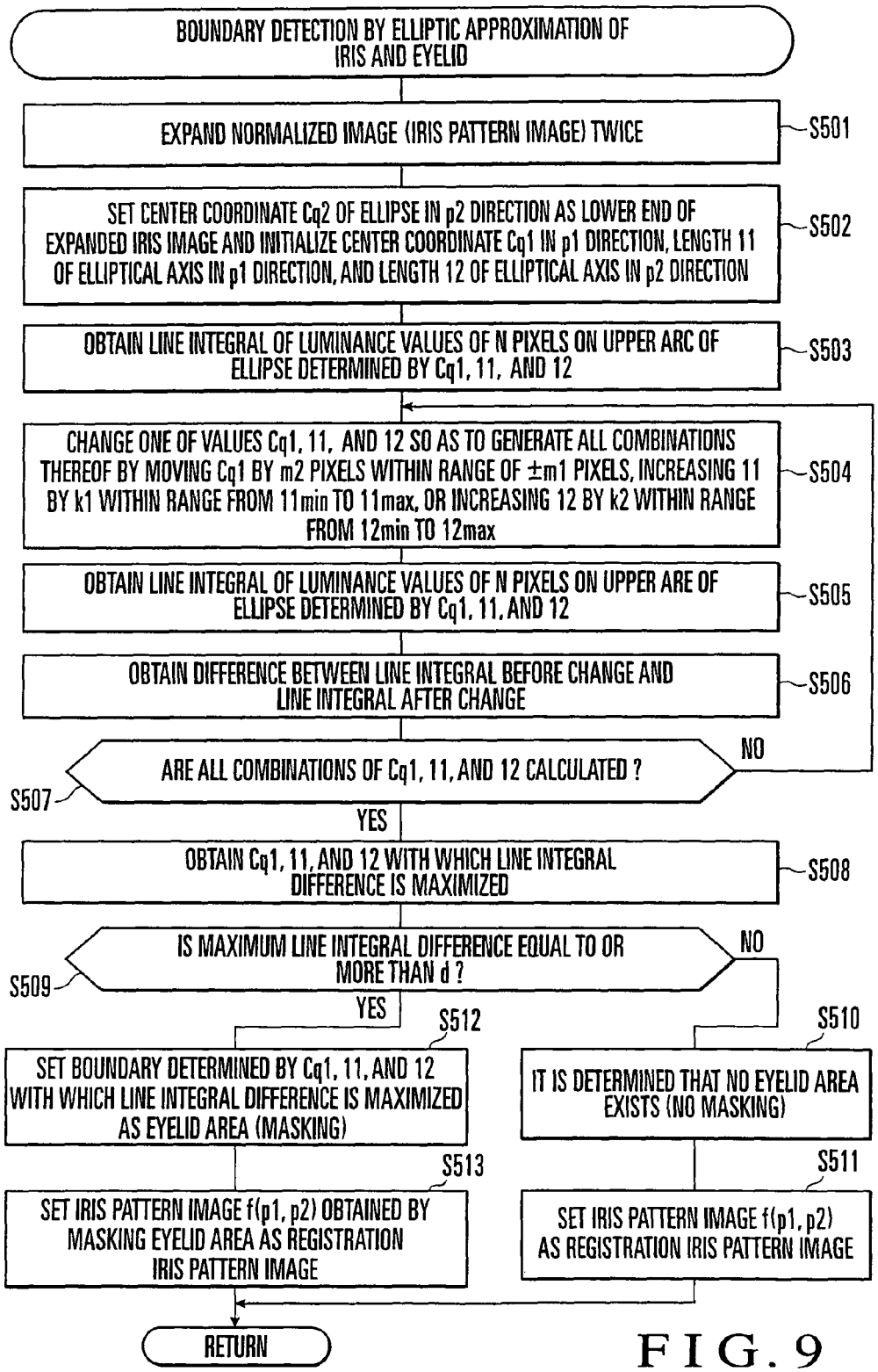
FIG. 9 is a flowchart for explaining boundary detection by elliptic approximation of the iris and eyelid in the iris authentication apparatus shown in FIG. 1.
Figures 11A, 11B, 11C:
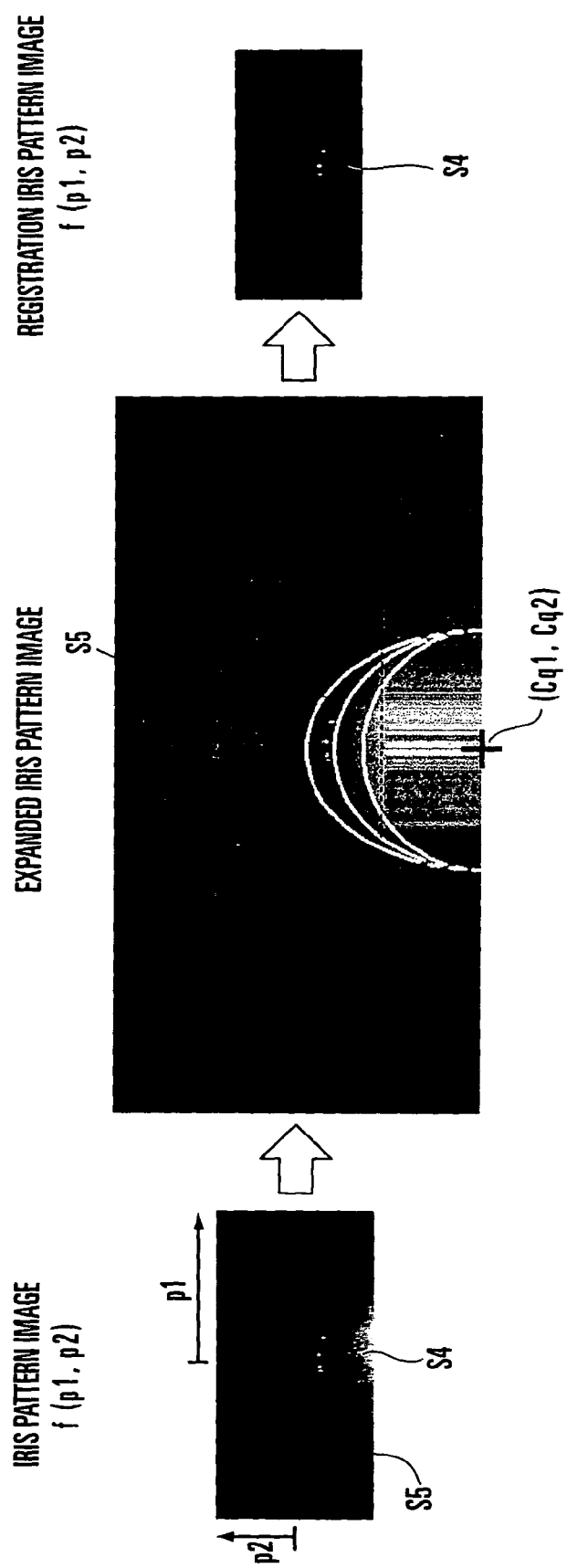
FIGS. 11A to 11C are views showing photographs on the display which respectively indicate an iris pattern image, an expanded iris pattern image, and a registration iris pattern image to explain boundary detection by elliptic approximation of the iris and eyelid.

(1) The iris pattern image f(p1, p2) is enlarged twice (FIG. 9: step S501; see FIGS. 11A and 11B).

(2) The lower end of the expanded iris pattern image f(p1, p2) is set to a center coordinate Cq2 in the p2 direction, and a center coordinate Cq1 in the p1 direction, a length l1 of the elliptical axis in the p1 direction, and a length l2 of the elliptical axis in the p2 direction are initialized (step S502). In this case, as the center coordinate Cq1, the center of the expanded iris pattern image f(p1, p2) in the p1 direction is set as an initial value. As the lengths l1 and l2 of the ellipse axes in the p1 and p2 directions, predetermined values are set as initial values, respectively.

(3) The line integral of the luminance values of N pixels on the upper arc (3π/4 [rad]) of the ellipse determined by Cq1, l1, and l2 in the expanded iris pattern image f(p1, p2) is obtained (step S503).

(4) One of the values Cq1, l1, and l2 is changed so as to generate all combinations thereof by "moving Cq1 by m2 pixels within the range of ±m1 pixels", "increasing l1 by k1 within the range from l1 min to l1 max", or "increasing l2 by k2 within the range from l2 min to l2 max" (step S504).

(5) The line integral of the luminance values of N pixels on the upper arc (3π/4 [rad]) of the ellipse determined by Cq1, l1, and l2 after the above change in the expanded iris pattern image f(p1, p2) is obtained (step S505).

(6) The difference between the line integral before change which is obtained in step S503 and the line integral after change which is obtained in step S505 is obtained (step S506).

(7) It is checked whether the differences between line integrals before change and line integrals after change are obtained with respect to all the combinations of Cq1, l1, and l2 (step S507).

(8) By repeating steps S504 to S507, the differences between the line integrals before change and the line integrals after change are obtained with respect to all the combinations of Cq1, l1, and l2.

(9) Among all the combinations, Cq1, l1, and l2 with which the line integral difference is maximized are obtained (step S508).

(10) It is checked whether the maximum line integral difference obtained in step S508 is equal to or more than a predetermined value d (step S509).

(11) If the maximum line integral difference is not equal to or more than the predetermined value d (NO in step S509), it is determined that no eyelid area exists (step S510), and the iris pattern image f(p1, p2) before expansion is set as a registration iris pattern image (step S511).

(12) If the maximum line integral difference is equal to or more than the predetermined value d (YES in step S509), it is determined that an eyelid area exist. In this case, the elliptic arc determined by Cq1, l1, and l2 obtained in step S508 is set as the eyelid boundary S5, and the area surrounded by the eyelid boundary S5 and the lower end of the iris pattern image f(p1, p2) before expansion is detected as the eyelid area S4. Masking is then executed for the detected eyelid area S4 (step S512; see FIG. 10C). In this case, all the luminance values of the pixels in the detected eyelid area S4 are set to "0", and the iris pattern image f(p1, p2) before expansion, which is obtained by masking the eyelid area S4, is set as a registration iris pattern image (step S513; see FIG. 11C).

In this detection of the eyelid boundary S5, for example, N=128, m1=50, m2=3, l1 min=50, l1 max=150, k1=3, l2 min=N2/4, l2 max=3·N2/4, k2=3, and d=2700. Assume that N1 and N2 represent the image size (N1×N2) of the iris pattern image f(p1, p2).

[Registration of Registration Iris Pattern Image]

The CPU 20-1 extracts the iris area S3 from the registration original image F(n1, n2), performs polar coordinate transformation of the image of the extracted iris area S3, and executes masking, as needed. The CPU 20-1 then stores the registration iris pattern image f(p1, p2) obtained in this manner in the hard disk 20-4 in correspondence with the ID number input in step S101 (step S110).

[Iris Collation]

Figure 10A:
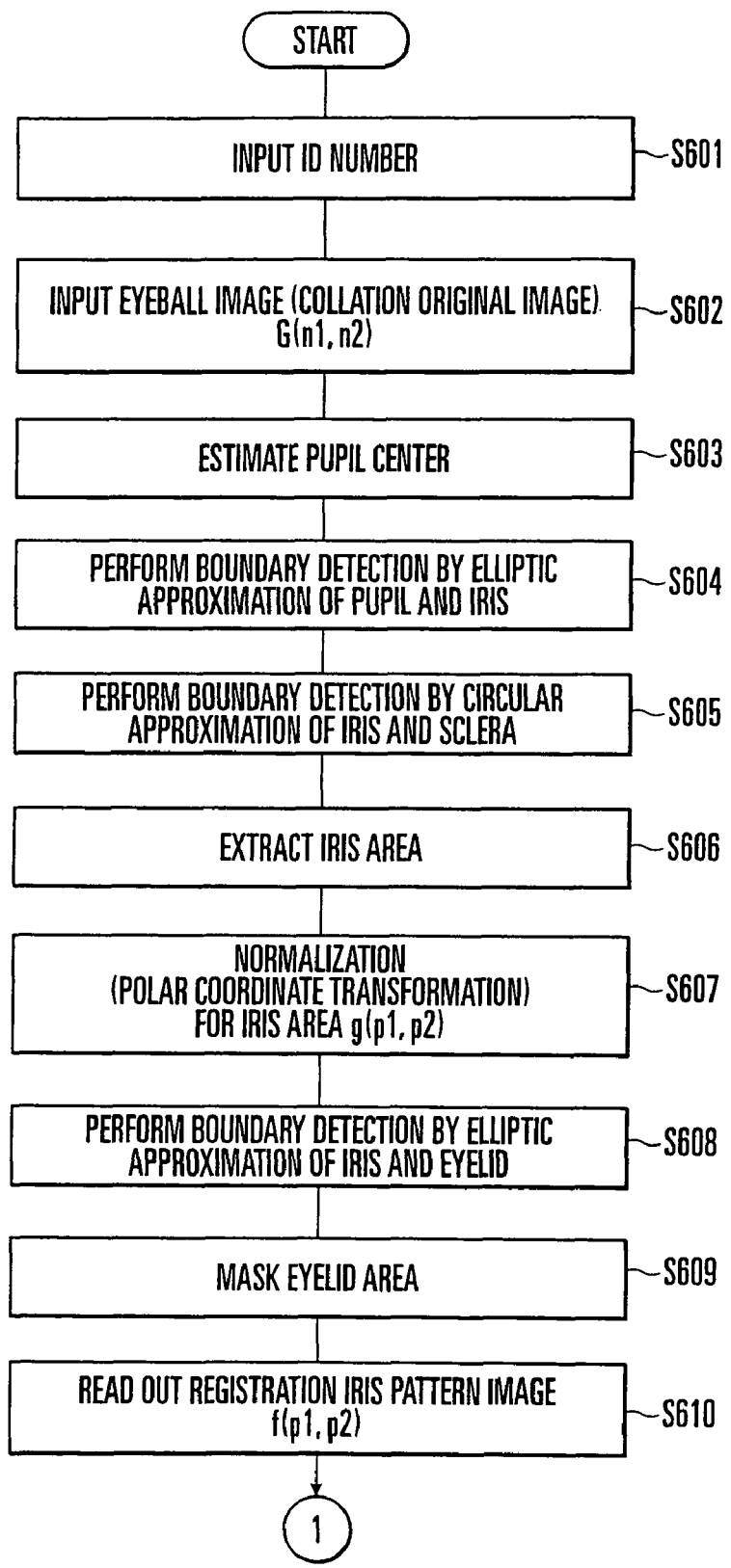
FIGS. 10A to 10E are flowcharts for explaining iris collating operation in the iris authentication apparatus shown in FIG. 1.
Figure 12A:
FIGS. 12A and 12B are views showing photographs on the display which respectively indicate a collation original image and an iris pattern image after coordinate transformation (normalized image)

In this iris authentication apparatus, iris collation is performed as follows. During operation, the user inputs the ID number assigned to him/her by using the ten-key pad 10-1 (step S601 in FIG. 10A) and stands in front of the camera 10-3. The camera 10-3 senses an eyeball image of the user and sends the sensed eyeball image as a collation original image G(n1, n2) (see FIG. 12A) to the control unit 20.

[Generation of Collation Iris Pattern Image]

Figure 12B:

The CPU 20-1 of the control unit 20 loads the collation original image G(n1, n2) from the operation unit 10 through the frame memory 20-5 (step S602) and performs "estimation of pupil center" (step S603), "boundary detection by elliptic approximation of pupil and iris" (step S604), "boundary detection by circular approximation of iris and sclera" (step S605), "extraction of iris area" (step S606), "normalization (polar coordinate transformation) of iris area" (step S607), "boundary detection by elliptic approximation of iris and eyelid" (step S608), and "masking for eyelid area" (step S609) with respect to the loaded collation original image G(n1, n2) in the same manner at the time of iris registration to obtain the collation iris pattern image g(p1, p2) (see FIG. 12B).

[Read of Registration Iris Pattern Image]

On the basis of the ID number input in step S601, the CPU 20-1 reads out the registration iris pattern image f(p1, p2) stored in the hard disk 20-4 in correspondence with the ID number (step S610). Note that in this embodiment, since a 1:1 collation scheme is used, it is necessary to input an ID number. According to a 1:N collation scheme (a scheme of performing collation with all registration iris pattern images), there is no need to input an ID number.

[Check on Unnecessary Area]

Reflection of light sometimes glares on the registration iris pattern image f(p1, p2) or collation iris pattern image g(p1, p2). An eyelid area by which light is reflected or which is masked needs to be cut off as an unnecessary area because it hinders correct collation. The CPU 20-1 cuts off an eyelid area by which light is reflected or which is masked from the registration iris pattern image f(p1, p2) or collation iris pattern image g(p1, p2) in the following manner.

Figure 10B:
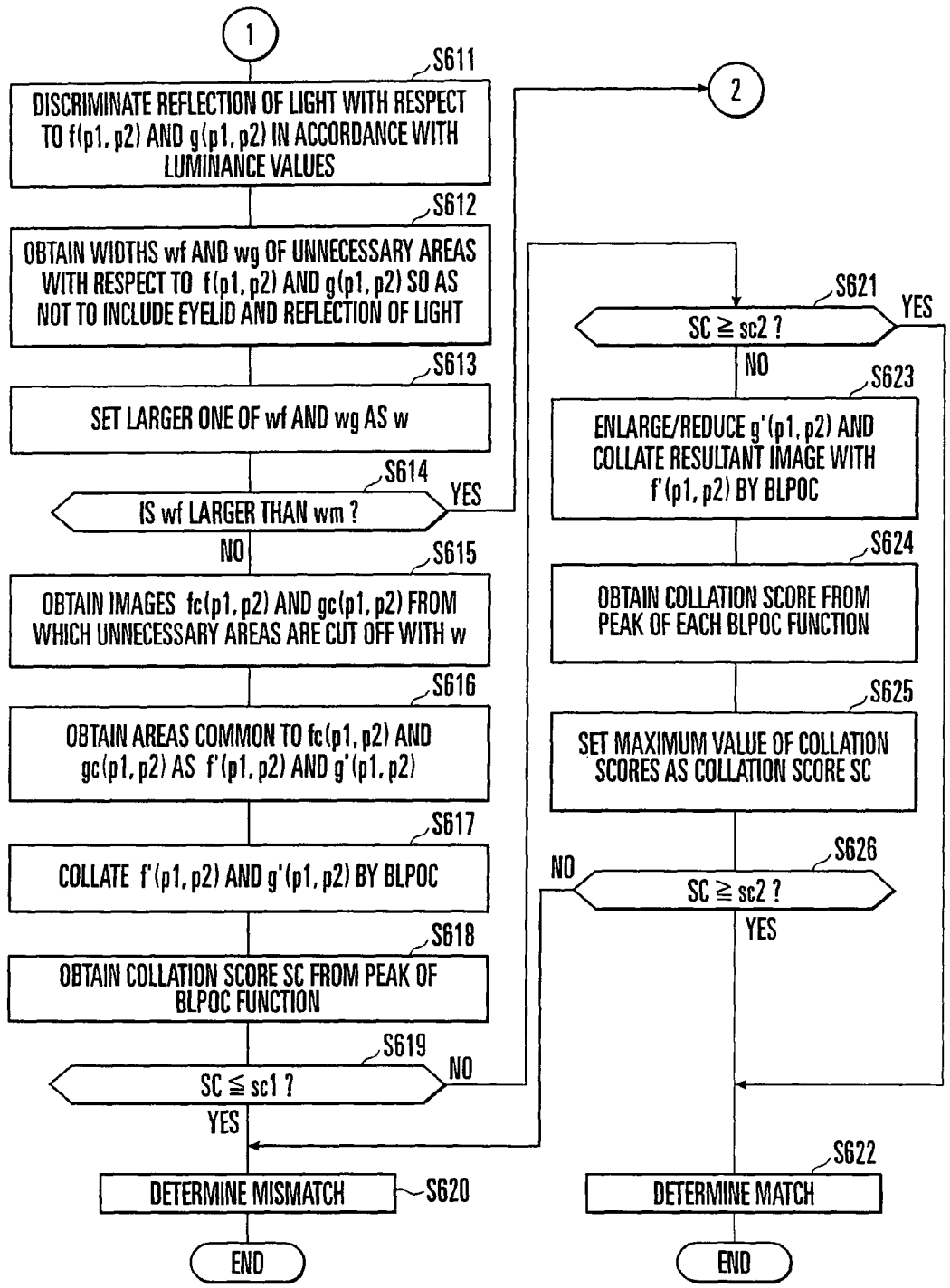

First of all, the reflection of light on the registration iris pattern image f(p1, p2) and collation iris pattern image g(p1, p2) is discriminated on the basis of luminance values (FIG. 10B: step S611).

Widths Wf and Wg of unnecessary areas are obtained on the registration iris pattern image f(p1, p2) and collation iris pattern image g(p1, p2) such that a masked eyelid area and reflection of light are not included (step S612; see FIGS. 13A and 13B). A larger one of Wf and Wg is set as a width w of an unnecessary area to be cut off (step S613).

Figure 10C:
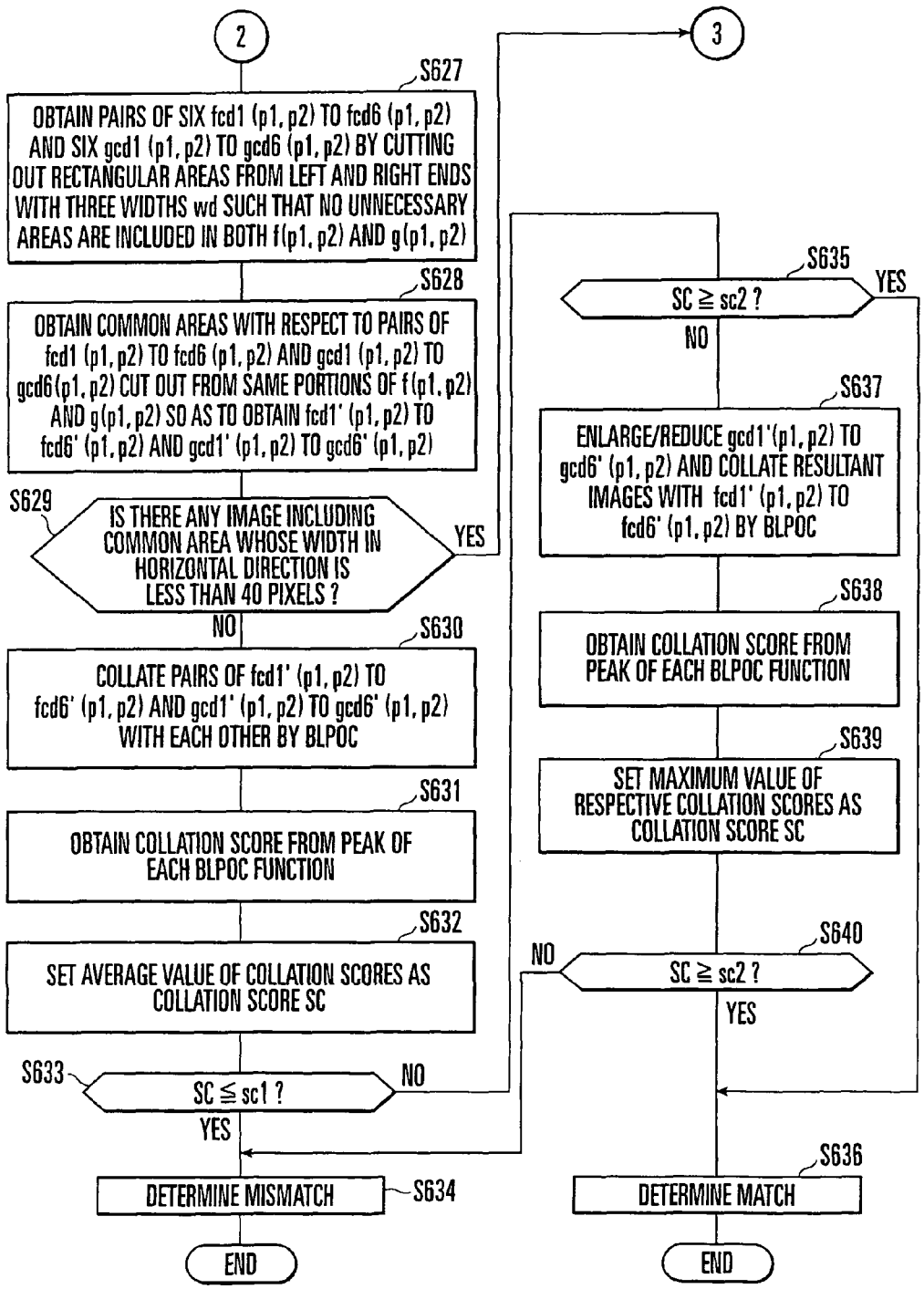

It is then checked whether the width w of this unnecessary area is larger than a predetermined threshold wm (step S614). If the width w is equal to or less than wm (NO in step S614), it is determined that a wide area can be ensured as a common area, and the flow advances to step S615. If the width w of the unnecessary area is larger than wm (YES in step S614), it is determined that a wide area cannot be ensured as a common area, and the flow advances to processing in step S627 and subsequent steps (FIG. 10C). The common area will be described later.

[Collation between Registration Iris Pattern Image and Collation Iris Pattern Image]

If the width w of the unnecessary area is equal to or less than wm (NO in step S614), i.e., it is determined that a wide area can be ensured as a common area used for collation, the CPU 20-1 immediately starts collation between the registration iris pattern image f(p1, p2) and the collation iris pattern image g(p1, p2). This collation is performed in the following manner.

[Cutting-Off of Unnecessary Area]

In collating the registration iris pattern image f(p1, p2) with the collation iris pattern image g(p1, p2), the CPU 20-1 cuts off images with the width w of the unnecessary area from the registration iris pattern image f(p1, p2) and the collation iris pattern image g(p1, p2), thereby obtaining a registration iris pattern image fc(p1, p2) and a collation iris pattern image gc(p1, p2) (step S615; see FIGS. 13C and 13D).

[Displacement Correction]

A displacement may occur between the registration iris pattern image f(p1, p2) and the collation iris pattern image g(p1, p2) due to, for example, the rotation of the head of the person or the motion of the eyeball even if the images obtained by imaging the same person. For this reason, in this embodiment, displacement correction is performed for the registration iris pattern image fc(p1, p2) and collation iris pattern image gc(p1, p2) from which the unnecessary areas are cut off.

This displacement correction is performed by obtaining a POC function between the registration iris pattern image fc(p1, p2) and the collation iris pattern image gc(p1, p2) by a phase-only correlation (POC) method and obtaining the displacement ($\pi$1, $\pi$2) of a correlation peak.

The phase-only correlation method is described in detail in Japanese Patent Laid-Open No. 10-63847 and K. Takita et al., "High-accuracy subpixel image registration based on phase-only correction", ICICE Trans. Fundamentals, Vol. E86-A, No. 8, pp. 1925-1934, August 2003. According to the phase-only correlation method, two-dimensional discrete Fourier transform is performed for a collation image (two-dimensional image) to generate a collation Fourier image. This collation Fourier image is combined with a registration Fourier image of a registration image which has been generated by performing similar processing. Performing processing for this combined Fourier image to set its amplitude to 1, and two-dimensional discrete Fourier transform is performed to obtain correlation data. This correlation data (POC function) comprises only a phase with its amplitude being set to 1 in a frequency space. This data can be basically regarded as data obtained by convoluting the collation image and the registration image, and represents the correlation between the collation image and the registration image.

In step S615, the CPU 20-1 cuts off images from the registration iris pattern image fc(p1, p2) and collation iris pattern image gc(p1, p2) by $\pi$1 and $\pi$2 pixels in the p1 direction (horizontal direction) and the p2 direction (vertical direction) to obtain a registration iris pattern image f'(p1, p2) and a collation iris pattern image g'(p1, p2) (see FIGS. 14C and 14D). With this operation, common areas between the registration iris pattern image fc(p1, p2) and the collation iris pattern image gc(p1, p2) are extracted as f'(p1, p2) and g'(p1, p2).

[Collation]

The CPU 20-1 sets the extracted registration iris pattern image f'(p1, p2) and the collation iris pattern image g'(p1, p2) as a registration image and a collation image, respectively, and collates the registration image f'(p1, p2) with the collation image g'(p1, p2) by a band-limited phase-only correlation (BLPOC) method (step S617). Note that BLPOC is described in detail in K. Ito et al., "A Fingerprint matching algorithm using phase-only correlation", IEICE Trans. Fundamentals, Vol. E87-A, No. 3, pp. 682-691, March 2004 and Ayumi Morita et al., "A Study of a Fingerprint Matching Algorithm Based on the Combination of Phase-Only Correlation and Feature-Based Matching", SICE Tohoku Chapter, the 219th workshop, material No. 219-5, November 2004. According to BLPOC, a registration image and a collation image are collated with each other by the phase-only correlation (POC) method using only an effective frequency band.

Figure 15A:
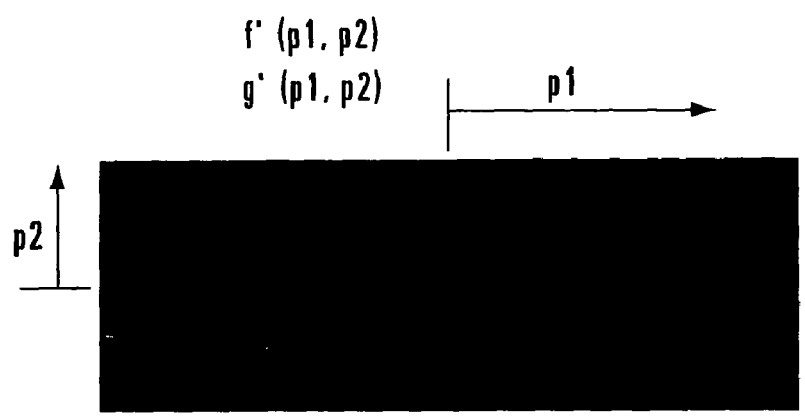
FIGS. 15A and 15B are views showing photographs on the display which respectively indicate effective frequency bands in images of frequency domains of a registration image and collation image when they are collated with each other by BLPOC.
Figure 15B:
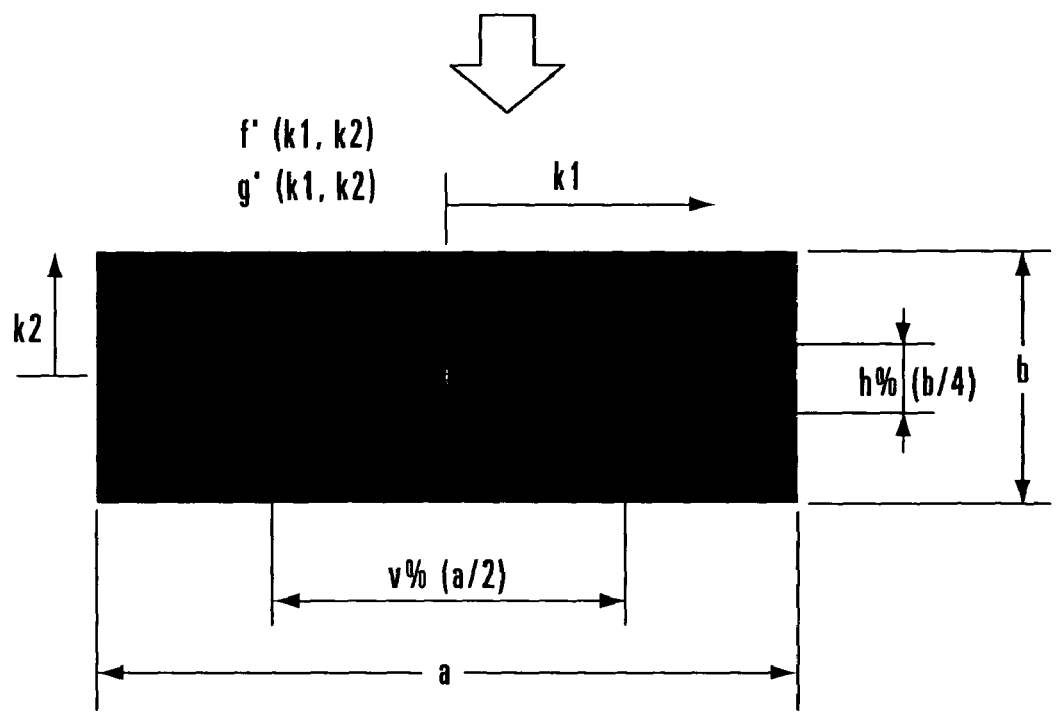

In this embodiment, in images f'(k1, k2) and g'(k1, k2) in the frequency domains of the registration image f'(p1, p2) and collation image g'(p1, p2) (see FIGS. 15A and 15B), h % (e.g., 50% (a/2)) of an image size (a×b) in the k1 direction and v % (e.g., 25% (b/4)) of an image size (a×b) in the k2 direction are set as effective frequency bands, and images in the effective frequency bands are cut out to be collated, thereby obtaining a BLPOC function.

The iris patterns of iris images cannot be assumed to be striped patterns like fingerprints, and vary depending on individuals. It is therefore difficult to specify the frequency band which a given iris has. In this embodiment, accurate authentication can be performed by determining effective frequency bands from image sizes (the sizes of common areas).

The CPU 20-1 obtains a collation score SC from the peak of the BLPOC function obtained by collation between the registration image f'(p1, p2) and collation image g'(p1, p2) by BLPOC (step S618). The CPU 20-1 compares the collation score SC with a predetermined value sc1 (step S619). If the collation score SC is equal to or less than the predetermined value sc1 (YES in step S619), it is determined that the registration image f'(p1, p2) does not match the collation image g'(p1, p2), and the input eyeball image is not authentic (step S620).

If the collation score SC is larger than the predetermined value sc1, the collation score SC is compared with a predetermined value sc2 (sc2>sc1) (step S621). If the collation score SC is equal to or larger than the predetermined sc2 (YES in step S621), it is determined that the registration image f'(p1, p2) matches the collation image g'(p1, p2), and the input eyeball image is authentic (step S622).

In this embodiment, a cutting error concerning the iris area S3 may appear as translation, enlargement/reduction, distortion, or the like in the image after polar coordinate transformation (normalized image). However, the cutting error concerning the iris area S3 is very small as compared with the entire area. Therefore, the cutting error concerning the iris area S3 has little influence on the registration iris pattern image f(p1, p2) and the collation iris pattern image g(p1, p2) after polar coordinate transformation, and accurate authentication can be performed.

If collation score SC satisfies sc1<SC<sc2 (NO in step S619), the CPU 20-1 enlarges/reduces (bicubic interpolation) the collation image g'(p1, p2) and collates the resultant image with the registration image f'(p1, p2) by BLPOC (step S623).

For example, the collation image g'(p1, p2) is reduced by 3%, 5%, and 7% in the p1 direction (horizontal direction), and each reduced collation image g'(p1, p2) is collated with the registration f'(p1, p2) by BLPOC. Likewise, the collation image g'(p1, p2) is enlarged by 3%, 5%, and 7% in the p1 direction (horizontal direction), and each enlarged collation image g'(p1, p2) is collated with the registration image f'(p1, p2) by BLPOC.

A collation score is then obtained from the peak of each BLPOC function (step S624), and the maximum value of these collation scores is set as the collation score SC (step S625). The collation score SC is compared with the predetermined value sc2 (step S626). If the collation score SC is equal to or more the predetermined value sc2 (YES in step S626), "match" is determined (step S622). If the collation score SC is less than the predetermined value sc2 (NO in step S626), "mismatch" is determined (step S623).

[Reason Why Collation is Performed in Consideration of Enlargement/Reduction]

In obtaining center coordinates C(Cp1, Cp2) of the registration original image F(n1, n2) or collation original image G(n1, n2) and center coordinates C(Ci1, Ci2) of the pupil and iris, if the positional relationship between the two sets of center coordinates shifts in the images of the same person, enlargement/reduction occurs in the p1 direction at the time of polar coordinate transformation. This becomes a cause for a decrease in collation score SC of the same person.

If the collation score SC satisfies sc1<SC<sc2, collation is performed while the collation image g'(p1, p2) is reduced or enlarged little by little in the p1 direction. This makes it possible to cope with a case wherein the collation score SC does not become equal to or more than sc2 due to a shift of the positional relationship of the center coordinates of the pupil or iris.

In this embodiment, in step S618, when the collation score SC is to be obtained from the peak of the BLPOC function between the registration image f'(p1, p2) and the collation image g'(p1, p2), only a correlation peak in a predetermined range near the center is used. In an environment in which the relationship between the vertical axis of the imaging apparatus and the actual vertical axis does not change, the vertical direction of an iris image does not greatly change. In this case, in an image obtained by polar coordinate transformation of an eyeball image, both the radial direction and the angular direction slightly shift, but do not greatly shift. When a correlation is obtained by using BLPOC under this condition, a peak appears almost near the center. If a peak appears at a position which greatly deviates from the center, the obtained peak cannot be said to be a correct result, and the authentication accuracy can be improved by performing collation upon removal of the peak.

[Segmentation of Iris Area]

If the width w of the unnecessary area is larger than wm (YES in step S614), i.e., it is determined that a wide area cannot be ensured as a common area used for collation, the CPU 20-1 obtains pairs of six segmented images fcd1(p1, P2) to fcd6(p1, P2) and six segmented images gcd1(p1, P2) to gcd6(p1, P2) by cutting out rectangular areas from the left and right ends with three widths wd (wd1, wd2, wd3) such that no unnecessary areas are included in both the registration iris pattern image f(p1, p2) and the collation iris pattern image g(p1, p2) (FIG. 10C: step S627).

Figure 16:
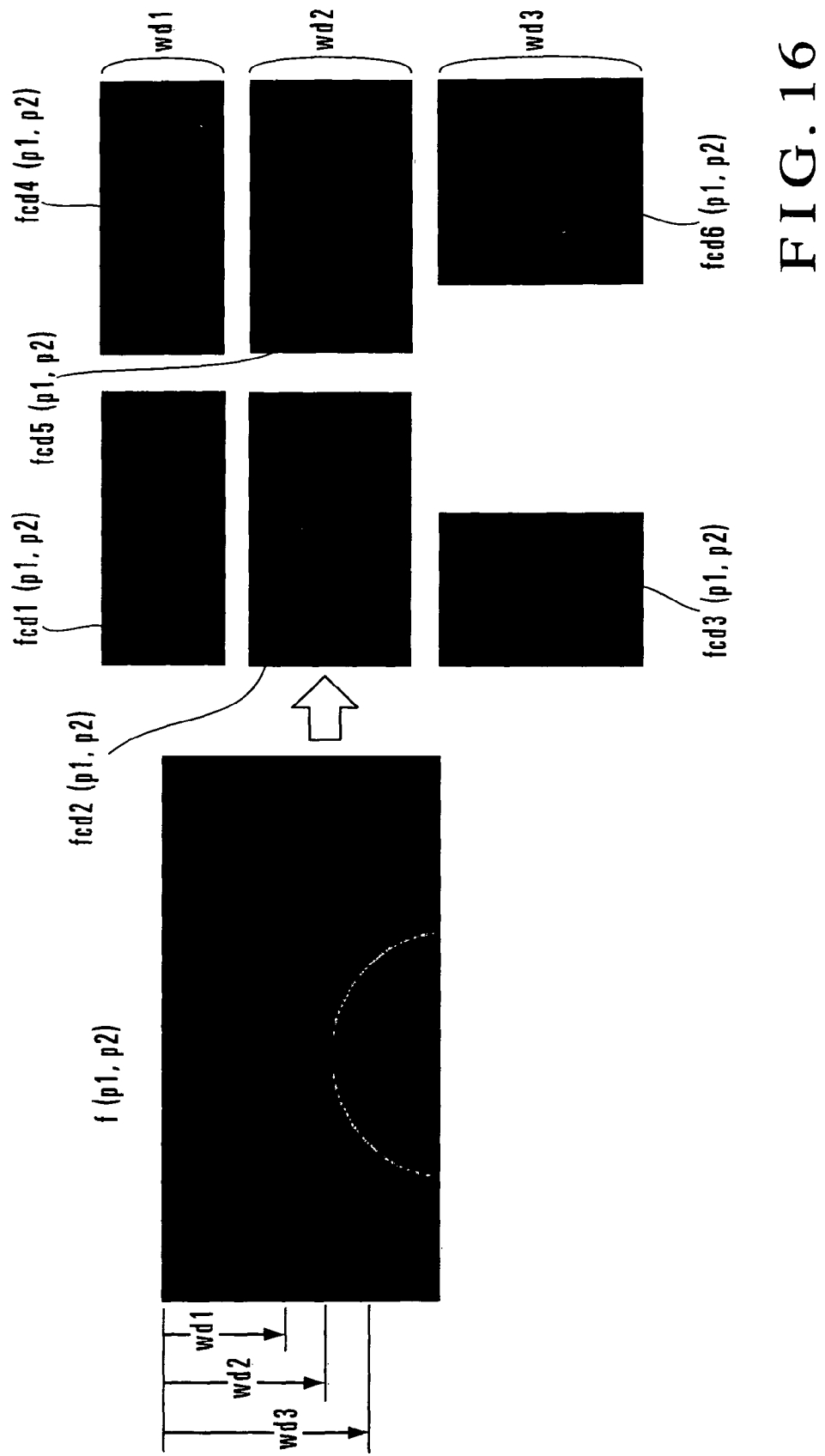
FIG. 16 is a view showing a photograph on the display which indicates a case wherein segmented images are cut out from a registration iris pattern image.

FIG. 16 shows a case wherein the segmented images fcd1(p1, p2) to fcd6(p1, p2) are cut out from the registration iris pattern image f(p1, p2). As shown in FIG. 16, cut-out widths wd from the upper end of the registration iris pattern image f(p1, p2) are set to three widths wd1, wd2, and wd3 (wd1<wd2<wd3), and rectangular areas are cut from the left and right ends with wd1, wd2, and wd3 so as not to include any unnecessary area, thereby obtaining the segmented images fcd1(p1, p2), fcd2(p1, p2), fcd3(p1, p2), fcd4(p1, p2), fcd5(p1, p2), and fcd6(p1, p2). In this embodiment, wd1=55 pixels, wd2=75 pixels, and wd3=95 pixels.

Figure 17:
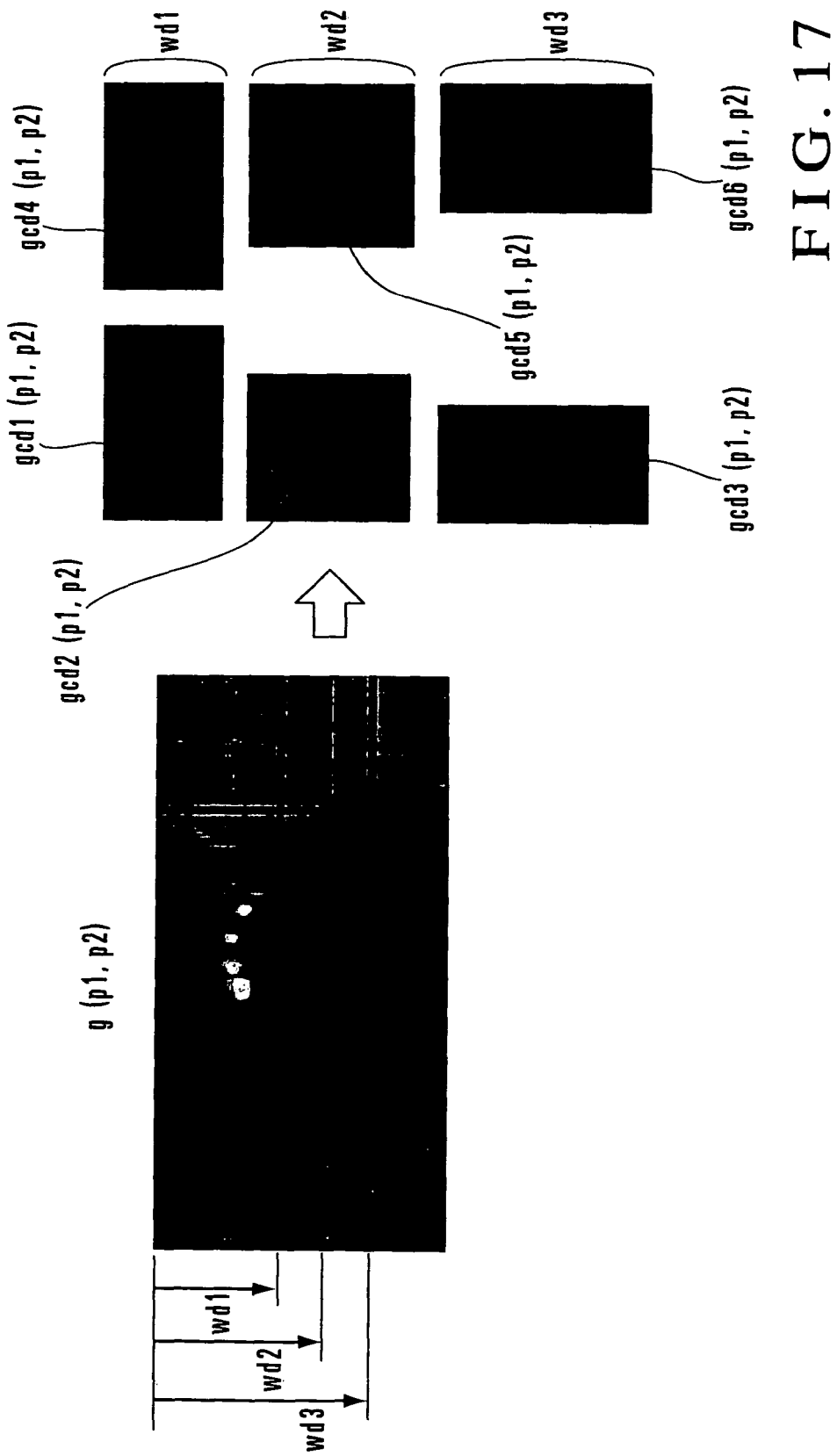
FIG. 17 is a view showing a photograph on the display which indicates a case wherein segmented images are cut out from a collation iris pattern image.

Likewise, with respect to the collation iris pattern image g(p1, p2), as shown in FIG. 17, cut-out widths wd from the upper end of the collation iris pattern image g(p1, p2) are set to three widths wd1, wd2, and wd3 (wd1<wd2<wd3), and rectangular areas are cut from the left and right ends with wd1, wd2, and wd3 so as not to include any unnecessary area, thereby obtaining the segmented images gcd1(p1, p2), gcd2 (p1, p2), gcd3(p1, p2), gcd4(p1, p2), gcd5(p1, p2), and gcd6 (p1, p2).

The CPU 20-1 obtains common areas in the same manner as in step S616 described above with respect to the pair of the segmented images fcd1(p1, p2) and gcd1(p1, p2), the pair of the segmented images fcd2(p1, p2) and gcd2(p1, p2), the pair of the segmented images fcd3(p1, p2) and gcd3(p1, p2), the pair of the segmented images fcd4(p1, p2) and gcd4(p1, p2), the pair of the segmented images fcd5(p1, p2) and gcd5(p1, p2), and the pair of the segmented images fcd6(p1, p2) and gcd6(p1, p2), and obtains segmented registration images fcd1'(p1, p2) to fcd6'(p1, p2) and segmented collation images gcd1'(p1, p2) to gcd6'(p1, p2) (step S628).

It is checked whether the segmented registration images fcd1'(p1, p2) to fcd6'(p1, p2) and the segmented collation images gcd1'(p1, p2) to gcd6'(p1, p2) include any image with a width of less than 40 pixels in the horizontal direction (p1 direction) (step S629). If all the images have widths of 40 pixels or more (NO in step S629), it is determined sufficient areas are ensured for all the common areas, and the flow advances to the processing in step S630 and subsequent steps. If there is at least one image with a width of less than 40 pixels (YES in step S629), it is determined that there is an image for which a sufficient area is not ensured as a common area, and the flow advances to the processing in step S641 (FIG. 10D) and subsequent steps.

[When Widths of All Images in Horizontal Direction Are 40 Pixels or More]

If the widths of the segmented registration images fcd1'(p1, p2) to fcd6'(p1, p2) and segmented collation images gcd1'(p1, p2) to gcd6'(p1, p2) in the horizontal direction are 40 pixels or more (NO in step S629), the CPU 20-1 collates the pairs of the fcd1'(p1, p2) to fcd6'(p1, p2) and the segmented collation images gcd1'(p1, p2) to gcd6'(p1, p2) with each other by BLPOC (step S630).

A collation score is obtained from the peak of each BLPOC function (step S631), and the average value of the collation scores is set as the collation score SC (step S632). If the collation score SC is equal to or less than the predetermined value sc1 (YES in step S633), "mismatch" is determined (step S634). If the collation score SC is equal to or more than the predetermined value sc2 (sc2>sc1) (YES in step S635), "match" is determined (step S636).

If the collation score SC satisfies sc1<SC<sc2 (NO in step S635), the segmented collation images gcd1'(p1, p2) to gcd6' (p1, p2) are enlarged/reduced, and the resultant images are collated with the corresponding segmented registration images fcd1'(p1, p2) to fcd6'(p1, p2) by BLPOC as in step S623 described above (step S637).

Collation scores are obtained from the respective BLPOC functions (step S638), and the maximum value of the collation scores is set as the collation score SC (step S639). If the collation score SC is equal to or more than the predetermined value sc2 (YES in step S640), "match" is determined (step S636). If the collation score SC is less than the predetermined value sc2 (NO in step S640), "mismatch" is determined (step S634).

[When There is Image with Width of Less than 40 Pixels]

Figure 10D:
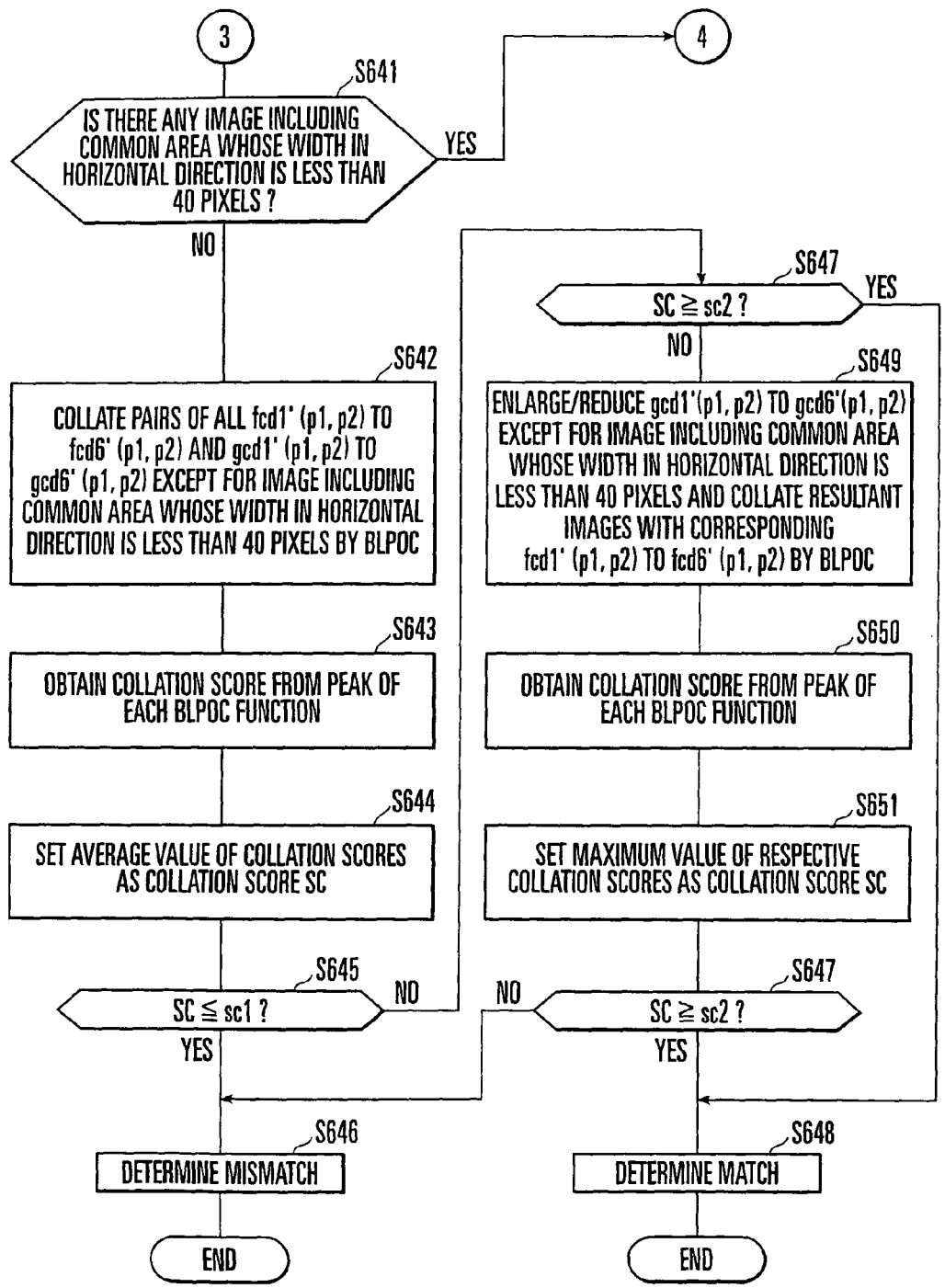

If the segmented registration images fcd1'(p1, p2) to fcd6' (p1, p2) and the segmented collation images gcd1'(p1, p2) to gcd6'(p1, p2) include an image with a width of less than 40 pixels in the horizontal direction (YES in step S629), the CPU 20-1 checks whether all the images have widths of less than 40 pixels (FIG. 10D: step S641). If at least one image has a width equal to or more than 40 pixels (NO in step S641), the flow advances to the processing in step S642 and subsequent steps. If the widths of all the images are less than 40 pixels (YES in step S641), the flow advances to the processing in step S653 (FIG. 10E) and subsequent steps.

[When at Least One Image Has Width of 40 Pixels or More]

If the segmented registration images fcd1'(p1, p2) to fcd6' (p1, p2) and the segmented collation images gcd1'(p1, p2) to gcd6'(p1, p2) include at least one image with a width of 40 pixels or more in the horizontal direction (YES in step S641), the CPU 20-1 collates the pairs of all the segmented registration images fcd1'(p1, p2) to fcd6'(p1, p2) and segmented collation images gcd1'(p1, p2) to gcd6'(p1, p2) except for the image with a width of less than 40 pixels by BLPOC (step S642).

Collation scores are obtained from the peaks of the respective BLPOC functions (step S643), and the average value of the collation scores is set as the collation score SC (step S644). If the collation score SC is equal to or less than the predetermined value sc1 (YES in step S645), "mismatch" is determined (step S646). If the collation score SC is equal to or more than the predetermined value sc2 (sc2>sc1) (YES in step S647), "match" is determined (step S648).

If the collation score SC satisfies sc1<SC<sc2 (NO in step S647), the segmented collation images gcd1'(p1, p2) to gcd6' (p1, p2) except for an image with a width of less than 40 pixels are enlarged/reduced, and the resultant images are collated with the corresponding segmented registration images fcd1' (p1, p2) to fcd6'(p1, p2) by BLPOC as in step S623 described above (step S649). Collation scores are obtained from the peaks of the respective BLPOC functions (step S650), and the maximum value of the collation scores is set as the collation score SC (step S651). If the collation score SC is equal to or more than the predetermined value sc2 (YES in step S652), "match" is determined (step S648). If the collation score SC is less than the predetermined value sc2 (NO in step S652), "mismatch" is determined (step S646).

[When All Images Have Widths of Not Less Than 40 Pixels]

Figure 10E:
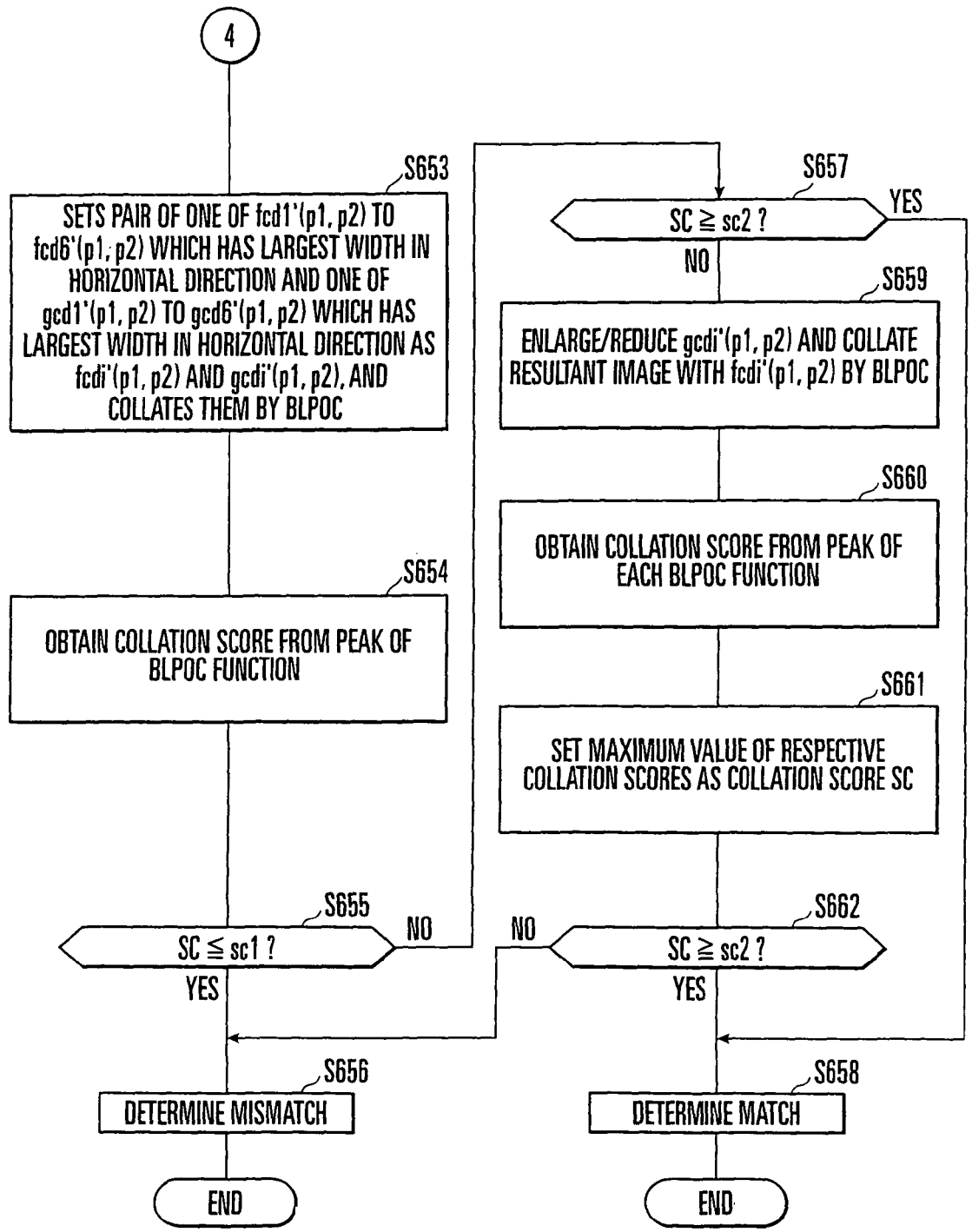

If the widths of all the segmented registration images fcd1' (p1, p2) to fcd6'(p1, p2) and segmented collation images gcd1'(p1, p2) to gcd6'(p1, p2) in the horizontal direction are less than 40 pixels (YES in step S641), the CPU 20-1 sets a pair of one of the segmented registration images fcd1'(p1, p2) to fcd6'(p1, p2) which has the largest width in the horizontal direction and one of the segmented collation images gcd1'(p1, p2) to gcd6'(p1, p2) which has the largest width in the horizontal direction as fcdi'(p1, p2) and gcdi'(p1, p2), and collates the segmented registration image fcdi'(p1, p2) and the segmented collation image gcdi'(p1, p2) by BLPOC (FIG. 10E: step S653).

The collation score SC is obtained from the peak of the BLPOC function (step S654). If the collation score SC is equal to or less than the predetermined value sc1 (YES in step S655), "mismatch" is determined (step S656). If the collation score SC is equal to or more than the predetermined value sc2 (sc2>sc1) (YES in step S657), "mismatch" is determined (step S658).

If the collation score SC satisfies sc1<SC<sc2 (NO in step S657), the segmented collation image gcdi'(p1, p2) is enlarged/reduced, and the resultant image is collated with the segmented registration image fcdi'(p1, p2) by BLPOC as in step S623 (step S649). Collation scores are then obtained from the peaks of the respective BLPOC functions (step S660), and the maximum value of the collation scores is set as the collation score SC (step S661). If the collation score SC is equal to or more than the predetermined value sc2 (YES in step S662), "match" is determined (step S658). If the collation score SC is less than the predetermined value sc2 (NO in step S662), "mismatch" is determined (step S656).

Figure 18:
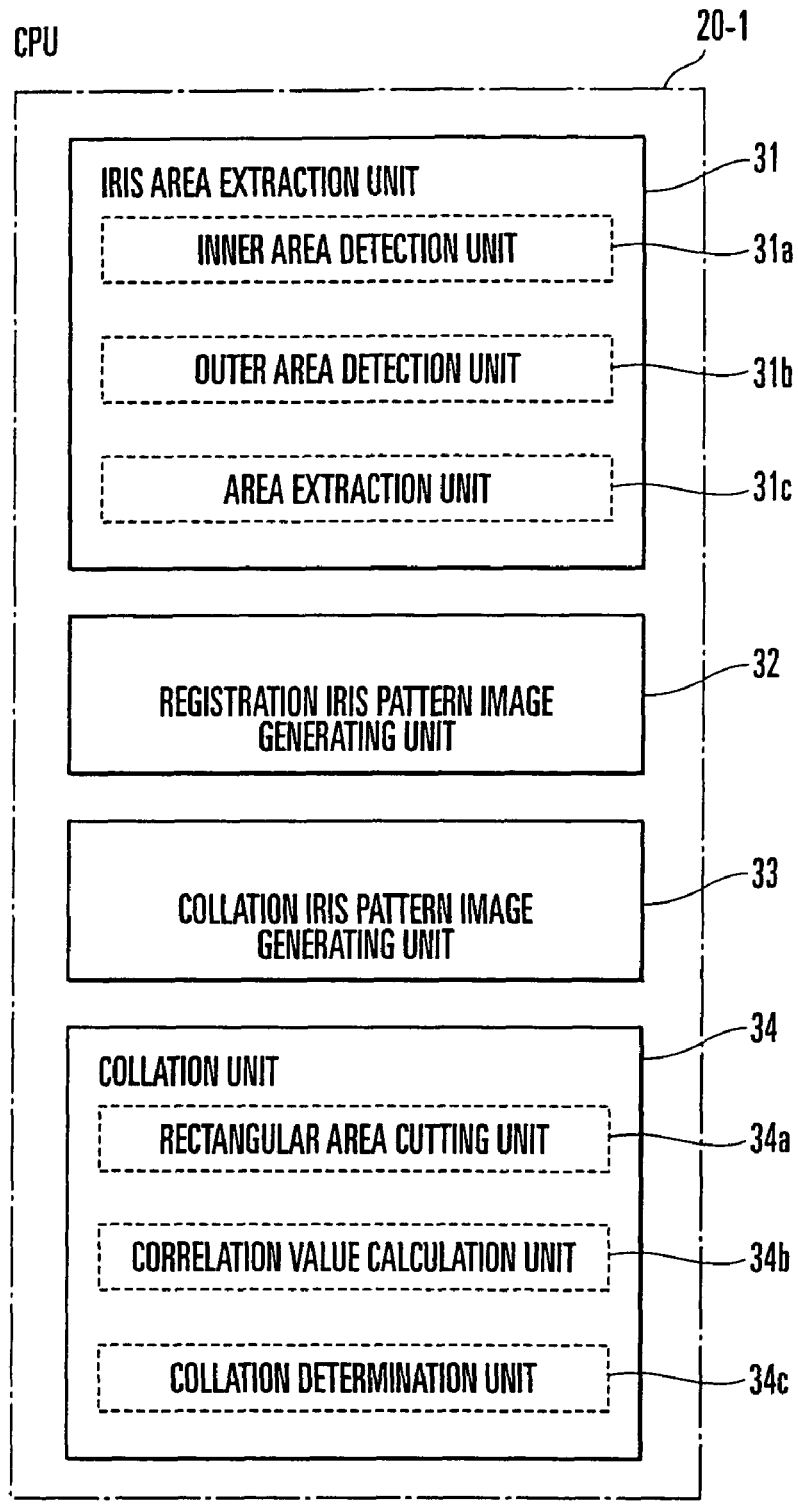
FIG. 18 is a functional block diagram of a CPU in FIG. 1.
Figure 19:
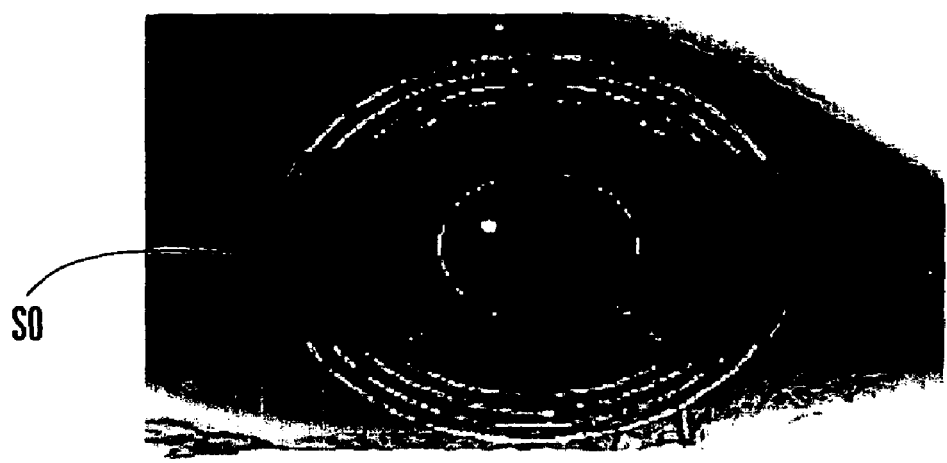
FIG. 19 is a view showing a graph on a display which indicates arcuated areas cut out from the iris portion of an eyeball image in a conventional iris authentication apparatus.

The function blocks of the CPU 20-1 will be described next. As shown in FIG. 18, the CPU 20-1 comprises an iris area extraction unit 31 which extracts iris areas from a sensed registration eyeball image and collation eyeball image, a registration iris pattern image generating unit 32 which, when the iris area extraction unit 31 extracts an iris area from a registration eyeball image, generates a registration iris pattern image by performing polar coordinate transformation of an image in the extracted iris area, a collation iris pattern image generating unit 33 which, when the iris area extraction unit 31 extracts an iris area from a collation eyeball image, generates a collation iris pattern image by performing polar coordinate transformation of an image in the extracted iris area, and a collation unit 34 which collates a registration iris pattern image output from the registration iris pattern image generating unit 32 and a collation iris pattern image output from the collation iris pattern image generating unit 33 on the basis of the correlation between them.

The iris area extraction unit 31 comprises an inner area detection unit 31a which detects the boundary between the pupil and iris of an eyeball image as the inner boundary of the iris by elliptic approximation, an outer area detection means 31b for detecting the boundary between the iris and sclera of an eyeball image as the outer boundary of the iris by either circular approximation or elliptic approximation, and an area extraction unit 31c which extracts, as an iris area, an area sandwiched between the inner boundary of the iris output from the inner area detection unit 31a and the outer boundary of the iris output from the outer area detection means 31b.

The collation unit 34 comprises a rectangular area cutting unit 34a which cuts out one or more rectangular areas from the registration iris pattern image output from the registration iris pattern image generating unit 32 and the collation iris pattern image output from the collation iris pattern image generating unit 33 so as not to include any non-iris portion, a correlation value calculation unit 34b which obtains a correlation value between rectangular areas common to the registration iris pattern image output from the registration iris pattern image generating unit 32 and the collation iris pattern image output from the collation iris pattern image generating unit 33, and a collation determination unit 34c which collates two images on the basis of the correlation value output from the collation unit 34.

The iris area extraction unit 31 executes the processing in steps S102 to S106 and in steps S602 to S606. The registration iris pattern image generating unit 32 executes the processing in step S107. The collation iris pattern image generating unit 33 executes the processing in step S607. The collation unit 34 executes the processing in steps S617 to S619.

In the iris area extraction unit 31, the inner area detection unit 31a executes the processing in step S104, the outer area detection means 31b executes the processing in step S105, and the area extraction unit 31c executes the processing in step S106.

In the collation unit 34, the rectangular area cutting unit 34a executes the processing in step S627, the correlation value calculation unit 34b executes the processing in steps S616 to S618, and the collation determination unit 34c executes the processing in step S619.

In the above embodiment, the cut-out widths wd are determined stepwise from the upper end of the registration iris pattern image f(p1, p2) or collation iris pattern image g(p1, p2), and rectangular areas are cut out for the respective widths. The BLPOC functions between areas common to these rectangular areas are obtained. However, rectangular areas may be selected and cut out so as to have as large areas as possible.

In the above embodiment, if the collation score SC satisfies sc1<SC<sc2, the collation image g'(p1, p2) is enlarged/reduced in the horizontal direction (the angular direction in the eyeball image), and the resultant image is collated with the registration image f'(p1, p2). However, the collation image may be enlarged/reduced in the vertical direction (the radial direction in the eyeball image), and the resultant image may be collated with the registration image f'(p1, p2). Alternatively, a combination of enlarging/reducing operation in the horizontal direction and that in the vertical direction may be employed.

If the centers of the iris and pupil are not properly extracted due to noise or the like, the corresponding error may appear as an error in the angular direction in the eyeball image. At this time, since these images are processed as two-dimensional images, enlarging/reducing in the angular direction makes it possible to easily reduce the influence of such error. This makes it possible to perform accurate authentication.

If the boundary of the iris cannot be properly detected due to noise or the like, the error may appear as an error in the radial direction in the eyeball image. At this time, since this image is processed as a two-dimensional image, enlarging/reducing in the radial direction makes it possible to easily reduce the influence of the error. In addition, this makes it possible to reduce the influence of the error in boundary detection. Therefore, accurate authentication can be performed.

In the above embodiment, the registration image f'(p1, p2) and the collation image g'(p1, p2) are collated with each other by the band-limited phase-only correlation (BLPOC) method. However, collation may be performed by the phase-only correlation (POC) method upon image reduction processing instead of band-limited processing. That is, two images may be collated by using "image reduction processing+phase-only correlation (POC) method" instead of "band-limited phase-only correlation (BLPOC) method".

According to the present invention, an image of an iris area extracted from a registration eyeball image is polar-coordinate-transformation into a registration iris pattern image (normalized image), and an image of an iris area extracted by a collation eyeball image is polar-coordinate-transformed into a collation iris pattern image (normalized image). The registration iris pattern image is collated with the collation iris pattern image on the basis of the correlation between them. Even if a slight error occurs in cutting an iris area from the eyeball image, accurate authentication can be performed.

According to the present invention, the boundary between the pupil and iris of an eyeball image is detected as the inner boundary of the iris by elliptic approximation, and the boundary between the iris and the sclera of the eyeball image is detected as the outer boundary of the iris by either circular approximation or elliptic approximation. An area sandwiched between the detected inner and outer boundaries of the iris is extracted as an iris area. This makes it possible to perform proper authentication even if the boundary between the pupil and the iris is not a perfect circle, thereby improving the authentication accuracy.

In addition, according to the present invention, polar coordinate transformation is performed for an image of an iris area extracted from a registration eyeball image with reference to the center of the inner boundary of the iris which is detected from the registration eyeball image, and polar coordinate transformation is performed for an image of an iris area extracted from a collation eyeball image with reference to the center of the inner boundary of the iris which is detected from the collation eyeball image. With this operation, both the images of the iris areas for registration and collation are polar-coordinate-transformed with reference to the accurate center of the pupil, thereby performing accurate authentication.

Furthermore, according to the present invention, one or more rectangular areas are cut out from a registration iris pattern image and a collation iris pattern image so as not to include any non-iris portion, and the correlation value between rectangular areas common to the registration iris pattern image and collation iris pattern image is obtained, and the two images are collated with each other on the basis of the correlation value. This makes it possible to accurately perform authentication even if an eyelid or eyelash is included in an image of an iris area or reflection of light glares on the image.

What is claimed is:

1. An iris authentication apparatus comprising:
   iris area extraction means for extracting iris areas from a sensed registration eyeball image and a sensed collation eyeball image;
   a registration pattern generating means for, when said iris area extraction means extracts an iris area from the registration eyeball image, generating a registration iris pattern image by performing polar coordinate transformation of an image in the extracted iris area;
   a collation pattern generating means for, when said iris area extraction means extracts an iris area from the collation eyeball image, generating a collation iris pattern image by performing polar coordinate transformation of an image in the extracted iris area; and
   a collation means for collating the registration iris pattern image output from said registration pattern generating means and the collation iris pattern image output from said collation pattern generating means,
   wherein said collation means comprises:
   a rectangular area cutting means for cutting out a plurality of rectangular areas from the registration iris pattern image output from said registration pattern generating means and the collation iris pattern image output from said collation pattern generating means so as not to include any non-iris portion,
   a correlation value calculation means for obtaining a plurality of band-limited phase-only correlation (BLPOC) values between rectangular areas common to the registration iris pattern image output from said registration pattern generating means and the collation iris pattern image output from said collation pattern generating means, and
   a collation determination means for collating the two images on the basis of a plurality of the band-limited phase-only correlation (BPLOC) values output from said correlation value calculation means, said correlation value calculation means determines, in association with said plurality of rectangular areas, a plurality of first collation scores that are based on a BLPOC of the collation iris pattern image before enlargement or reduction thereof with the registration iris pattern image, and a plurality of second collation scores that are based on BLPOC of the collation iris pattern image after enlargement or reduction thereof in the angular direction or the radial direction in the eyeball image with the registration iris pattern image,
   wherein a mismatch occurs if a first determination collation score, which is obtained from said plurality of first collation scores associated with said plurality of rectangular areas, is smaller than a predetermined first reference value:
   wherein a match occurs if said first determination collation score is not smaller than a predetermined second reference value;
   wherein a mismatch occurs if said first determination collation score is not smaller than said first reference value but smaller than said second reference value and if a second determination collation score which is obtained from said plurality of second collation scores associated with said plurality of rectangular areas is smaller than said second reference value; and
   wherein a match occurs if said first determination collation score is not smaller than said first reference value but smaller than said second reference value and if said second determination collation score is not smaller than said second reference value.

2. An apparatus according claim 1, wherein said iris area extraction means comprises:
   an inner area detection means for detecting a boundary between a pupil and iris of the sensed eyeball image as an inner boundary of the iris by elliptic approximation,
   an outer area detection means for detecting a boundary between an iris and sclera of an eyeball image as an outer boundary of the iris by one of circular approximation and elliptic approximation, and
   an area extraction means for extracting, as the iris area, an area sandwiched between the inner boundary of the iris output from said inner area detection means and the outer boundary of the iris output from said outer area detection means.

3. An apparatus according to claim 1 wherein
   said registration pattern generating means performs polar coordinate transformation of an image of an iris area extracted from the sensed registration eyeball image with reference to a center of an inner boundary of the iris detected from the registration eyeball image, and
   said collation pattern generating means performs polar coordinate transformation of an image of an iris area extracted from a collation eyeball image with reference to a center of an inner boundary of an iris detected from the sensed collation eyeball image.

4. An apparatus according to claim 1, wherein said first determination collation score is an average value of said plurality of first collation scores associated with said plurality of rectangular areas, and said second determination collation score is a maximum value of said plurality of second collation scores associated with said plurality of rectangular areas.

5. An apparatus according to claim 1, wherein, if said first determination collation score is not smaller than said first reference value but smaller than said second reference value, said correlation value calculation means calculates said plurality of second collation scores that are based on BLPOC of the collation iris pattern image after enlargement or reduction thereof by each predetermined proportion in the angular direction or the radial direction in the eyeball image with the registration iris pattern and then determines a maximum value of the thus calculated said plurality of second collation scores as a second collation score for associated one of said plurality of rectangular areas.

* * * * *